US011861667B1

(12) United States Patent
Nistor et al.

(10) Patent No.: US 11,861,667 B1
(45) Date of Patent: Jan. 2, 2024

(54) CUSTOMS DUTY AND TAX ESTIMATION ACCORDING TO INDICATED RISK TOLERANCE

(71) Applicant: Avalara, Inc., Seattle, WA (US)

(72) Inventors: Adrian Nistor, Toronto (CA); Craig Evan Reed, Toronto (CA); Amy E. Morgan, Seattle, WA (US); David Kempe, Auburn, WA (US); Mark Alan Withers, Bainbridge Island, WA (US); Jurgis K P Vilis, Toronto (CA)

(73) Assignee: Avalara, Inc., Seattle, WA (US)

( * ) Notice: Subject to any disclaimer, the term of this patent is extended or adjusted under 35 U.S.C. 154(b) by 773 days.

(21) Appl. No.: 16/803,815

(22) Filed: Feb. 27, 2020

Related U.S. Application Data

(60) Provisional application No. 62/943,684, filed on Dec. 4, 2019, provisional application No. 62/930,159, filed on Nov. 4, 2019.

(51) Int. Cl.
*G06Q 30/0601* (2023.01)
*G06Q 30/04* (2012.01)
(Continued)

(52) U.S. Cl.
CPC ......... *G06Q 30/04* (2013.01); *G06F 3/04847* (2013.01); *G06F 16/285* (2019.01);
(Continued)

(58) Field of Classification Search
CPC .... G06Q 30/04; G06Q 30/0635; G06Q 40/10; G06F 16/285; G06F 16/953; G06F 3/04847; H04L 67/01
See application file for complete search history.

(56) References Cited

U.S. PATENT DOCUMENTS

| 7,783,536 B2 | 8/2010 | William et al. |
| 7,933,803 B1 | 4/2011 | Nadler et al. |

(Continued)

OTHER PUBLICATIONS

O. Uzuner and L. McKnight, "Sales taxes on the Internet: when and how to tax?," Proceedings of the 34th Annual Hawaii International Conference on System Sciences, Maui, HI, USA, 2001, pp. 9 pp.-, doi: 10.1109/HICSS.2001.926522. (Year: 2001).*

(Continued)

*Primary Examiner* — Michelle T Kringen
(74) *Attorney, Agent, or Firm* — Jeremiah J. Baunach; VLP Law Group LLP

(57) ABSTRACT

A service engine of a processor-based system determines an estimated amount of taxes due in association with a proposed transaction based on a risk tolerance value specified by a party to the transaction, such as a seller. Multiple classification code queries are generated for classifying an item that is the subject of the proposed transaction, from which a plurality of classification code candidates are determined. Each such classification code candidate is considered in determination of multiple corresponding possible tax-due amounts, and the taxes due for the proposed transaction are determined by the service engine based on a statistical calculation corresponding to the specified risk tolerance value. The service engine provides the estimated tax due amount to one or more parties to the proposed transaction.

16 Claims, 14 Drawing Sheets

(51) Int. Cl.
*G06Q 40/10* (2023.01)
*G06F 3/04847* (2022.01)
*G06F 16/953* (2019.01)
*G06F 16/28* (2019.01)
*H04L 67/01* (2022.01)

(52) U.S. Cl.
CPC ....... *G06F 16/953* (2019.01); *G06Q 30/0635* (2013.01); *G06Q 40/10* (2013.01); *H04L 67/01* (2022.05)

(56) References Cited

U.S. PATENT DOCUMENTS

| | | | |
|---|---|---|---|
| 8,620,578 | B1 | 12/2013 | Brown et al. |
| 8,725,407 | B2 | 5/2014 | Hurley et al. |
| 9,760,915 | B2 | 9/2017 | Pavlou et al. |
| 10,445,818 | B1 | 10/2019 | Chowdhary |
| 10,769,611 | B2 | 9/2020 | McNeel |
| 2007/0136158 | A1 | 6/2007 | Rawlings et al. |
| 2007/0136159 | A1 | 6/2007 | Rawlings et al. |
| 2009/0187500 | A1* | 7/2009 | Wilson ............... G06Q 40/00 705/31 |
| 2012/0124050 | A1* | 5/2012 | Yang ............... G06F 16/3347 707/739 |
| 2017/0004583 | A1* | 1/2017 | Wang ............... G06Q 40/123 |
| 2018/0211322 | A1* | 7/2018 | Lintner ............... H04L 9/3236 |
| 2019/0251501 | A1* | 8/2019 | Reid ............... G06Q 10/08345 |

OTHER PUBLICATIONS

"U.S. Harmonized Tariff System Codes Duty Rates (HTS Codes)," Foreign Trade Online, Revised Feb. 14, 2020. https://www.foreign-trade.com/reference/hscode-duty-rate.htm. 2 pages.

* cited by examiner

CUSTOMS DUTY AND TAX ESTIMATION ACCORDING TO INDICATED RISK TOLERANCE

BRIEF SUMMARY

When businesses sell or buy goods, they are required by law to compute the amounts of money they may owe as taxes and/or duties to various tax jurisdictions, and then remit these amounts to the tax jurisdictions. If they fail to accurately report and remit taxes, they may be subject to audits and fines; ignorance of the law is not an excuse for failure to comply. Moreover, determining the taxes and/or duties due may be very complex. There are over 10,000 tax jurisdictions in the United States, including both individual states and distinct cities or other localities within those states, and almost 10 million taxability rules related to products and services.

Sellers of goods, for example, are subjected to many requirements about the taxes they owe. In particular, they must determine whether and when they must collect taxes in each individual jurisdiction, such as each state, locality, etc. For each jurisdiction, a seller may need to register with that state's taxing agency, set up internal processes for collecting sales tax in accordance with the tax rules of the jurisdiction, keeping records for the collected sales tax, file reports with the jurisdiction, and finally pay the tax to the appropriate taxation entity.

Sellers are also subject to requirements for instances when they do not owe sales tax. For instance, while each tax jurisdiction taxes many products and services, it does not tax all of them. In some instances, the products being sold maybe exempt from taxes, but that requires detailed research. For instance, while deodorant was taxable in 2018 in Texas, antiperspirant was tax exempt. At the same time, cowboy boots were exempt from sales tax in Texas, but not in New York. Plus, when a seller buys certain items for resale, the items may be exempt from sales tax as long as the seller creates and maintains proper certificates.

Complexities in determining appropriate taxes and duties may arise from the location of the buyer and the seller, the location of a distributor, or other factors. For instance, some states and local authorities have taxes with origin-based rules, which means that a sales tax is charged from the seller's location, while other state and local authorities have taxes with destination-based rules, which means that a sales tax is charged from the buyer's location. Additional complexities arise from the fact that different tax jurisdictions charge different percentage rates.

Businesses generally collect information relating to their operations and transactions, such as by using enterprise resource planning (ERP) software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on. However, ERP applications, accounting applications, e-commerce applications and other conventionally used applications fail to provide accurate, reliable per-jurisdiction tax compliance information for their cross-border sales needs, including estimated taxes due in a proposed transaction, in a timely and efficient manner according to the various different rules in various different tax jurisdictions.

As one example, the Harmonized Commodity Description and Coding System (HS) is an international nomenclature for the classification of products that may typically allow participating countries to classify traded goods on a common basis for customs purposes. The HS defines codes, also known as HS codes, for a very large fraction of all items traded internationally. Most customs authorities require HS codes to be provided on import and export declarations.

HS codes are numerical codes of at least six digits that describe what is being shipped to and from countries worldwide; the first two numbers define a "Chapter," the second two a "Heading," and the last two a "Subheading." For instance, as of the time of this writing, HS Code 850870 defines "parts of vacuum cleaners". However, HS codes may change at least every five years. The first six digits of the HS code are common to all countries. Beyond those, each country is permitted to add additional numbers to suit its own tariff and statistical needs, creating 8-, 10-, and sometimes 12-digit national codes. Such national tariff codes may also change, sometimes several times per year.

In most countries, the importer of record is solely responsible for the accuracy of the HS codes declared to customs. Improper HS classification can result in overpayment of customs due, which reduces profits. Or in underpaying, which can result in penalties. However, it will be appreciated that in a variety of circumstances, such HS codes may be unavailable or difficult to determine, especially in jurisdictions for which the available descriptions of various products and services may be ambiguous or lacking.

Various approaches for estimating taxes and duties associated with cross-border transactions rely on several detailed input parameters to perform various calculations. While several of these parameters may be available for one or more items being sold (i.e., price, shipping cost), others may not (i.e., HS code, tax code, HS code-specific parameters); alternatively or in addition, a customer may not possess the necessary knowledge and/or resources to know what associated parameters are, or whether they apply to the customer's transactions. Therefore, existing approaches may be unable to calculate the associated taxes and duties.

For example, consider a merchant who has 100,000 items in their catalog and wants to be able to sell them in a large number of international destination zones (such as 100 or more countries, customs unions, or other jurisdictions). Various existing approaches may require that the merchant pass a complete HS code for each item in their transaction, along with specific input parameters (per HS code) in order to calculate the associated taxes and duties. Because the complete HS code is likely different in each jurisdiction, the customer would have to request 100 classifications per item. As a result, the merchant would have to assign 10 million classifications. In addition, they may also have to determine and provide the unique parameters and tax codes for each item. This exercise is costly and time consuming, likely prohibiting the merchant from using existing approaches to satisfy their cross-border sales needs.

Embodiments of systems and techniques described herein offer customer sellers automated functionality to estimate taxes associated with a transaction for products and/or services, such as may be provided prior to the completion of that transaction. Such embodiments may generate, for example, an instant estimated customs duty and tax value without requiring the customer to provide any specific and precise input parameters, such as without requiring that customer to provide any "customs-grade" HS system specific to the destination country, as well as certain data elements required by the complete tariff code. Thus this improves technology of networked and computerized estimation of taxes and duties by increasing the speed and efficiency of the operations of networked and computerized tax and duty estimation systems.

To solve the above technical problems, disclosed herein is a method comprising: causing a seller client computer distinct from the server system to present to a seller an option of selecting between a first risk tolerance value and a second risk tolerance value that is distinct from the first risk tolerance value; inputting from the seller client computer, in response to the presented option, a selection input indicating a selection by the seller of one of the first risk tolerance value and the second risk tolerance value; storing seller data about the seller, the seller data including the selection input and item data about an item that the seller offers for sale from a seller jurisdiction; inputting order data about a prospective sale of the item by the seller to a buyer in a buyer jurisdiction distinct from the seller jurisdiction; forming, from the order data, one or more classification code queries for classifying the item for the prospective sale; receiving, responsive to the one or more classification code queries, a plurality of classification code candidates that are potentially applicable for classifying the item for the prospective sale; retrieving a plurality of possible tax due amounts for respective ones of the classification code candidates; extracting an estimated tax due amount as a statistic of the retrieved possible tax due amounts, the estimated tax due amount having a first value responsive to the selection input indicating a selection of the first risk tolerance value, and a second value different from the first value responsive to the selection input indicating a selection of the second risk tolerance value; and causing the estimated tax due amount to be communicated to the client computer.

Also disclosed herein is another method comprising: receiving information from a first user regarding a proposed taxable transaction with a second user for one or more items, the received information including an indicated selection by the first user of a first taxation risk tolerance value for the proposed taxable transaction; generating, based at least in part on the received information, one or more classification code queries associated with the one or more items; retrieving, based on the one or more associated classification code queries, a plurality of potential taxation amounts for the one or more items; determining an estimated taxation amount due for the proposed taxable transaction based at least in part on the retrieved plurality of potential taxation amounts and on the first taxation risk tolerance value; and providing the estimated taxation amount due to the first user in association with the proposed taxable transaction.

Also, disclosed herein is a system comprising at least one processor and a memory coupled to the at least one processor. The memory stores instructions that, when executed by the at least one processor, cause the system to perform operations that include: to receive information from a first user regarding a proposed taxable transaction with a second user for one or more items, the received information including an indicated selection by the first user of a first taxation risk tolerance value for the proposed taxable transaction; to generate, based at least in part on the received information, one or more classification code queries associated with the one or more items; to retrieve, based on the one or more associated classification code queries, a plurality of potential taxation amounts for the one or more items; to determine an estimated taxation amount due for the proposed taxable transaction based at least in part on the retrieved plurality of potential taxation amounts and on the first taxation risk tolerance value; and to provide the estimated taxation amount due to the first user in association with the proposed taxable transaction.

Also disclosed herein is a non-transitory computer-readable storage medium having computer-executable instructions stored thereon that, when executed by at least one processor, cause the at least one processor to perform operations that include: receiving information from a first user regarding a proposed taxable transaction with a second user for one or more items, the received information including an indicated selection by the first user of a first taxation risk tolerance value for the proposed taxable transaction; generating, based at least in part on the received information, one or more classification code queries associated with the one or more items; retrieving, based on the one or more associated classification code queries, a plurality of potential taxation amounts for the one or more items; determining an estimated taxation amount due for the proposed taxable transaction based at least in part on the retrieved plurality of potential taxation amounts and on the first taxation risk tolerance value; and providing the estimated taxation amount due to the first user in association with the proposed taxable transaction.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

There are many types of taxes, tariffs, and duties (collectively referred to herein as "taxes" for the sake of descriptive simplicity) for businesses. Such taxes may include sales tax, use tax, excise tax, value-added tax, industry-specific taxes, cross-border taxes, import duties, custom duties, protective duties, source-dependent trade tariffs, and so on. Further, for a single transaction, taxes may be due to more than one tax jurisdiction, such as different states, as well as localities within the states (e.g., counties, cities, municipalities, etc.)—each of which may charge different percentage rates. As noted above, determining the taxes due is often very complex. Such complexity may arise from the location of the buyer, the seller, and/or one or more distributors, as well as upon the nature and type of goods or services being sold. For example, some state and local authorities tax have origin-based rules, which means that a sales tax is charged from the seller's location; other state and local authorities tax have destination-based rules, which means that a sales tax is charged from the buyer's location.

Embodiments described herein may provide international buyers with one or more estimated taxes applicable to cross-border orders. Such estimation functionality may be performed either at checkout or on a seller's (localized) item detail page, such as by using available item details and machine learning techniques to identify a narrow range of possible HS code "candidates" for each item. In various embodiments, the described estimation functionality may then identify the appropriate customs duty rate from the candidates based on a user-specified risk tolerance (e.g., a minimum risk tolerance, maximum risk tolerance, average risk tolerance, etc.) to produce an estimated amount (a "quote") for one or more taxes associated with a transaction.

Figure 1:
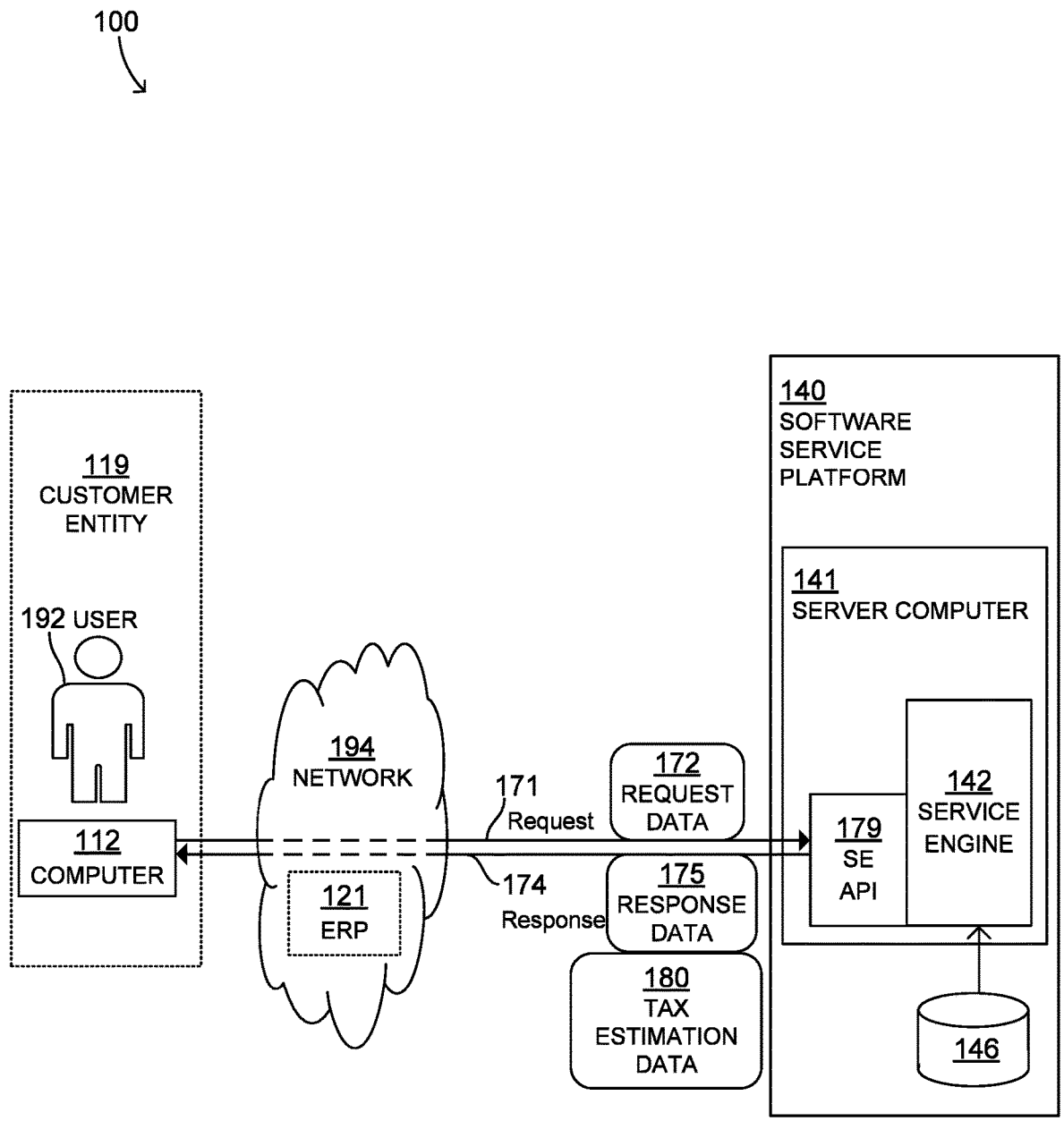
FIG. 1 is a block diagram showing an exemplary configuration of a system, according to various embodiments of the present disclosure.

FIG. 1 is a block diagram showing an exemplary configuration of a system 100 working with a new service engine 142 that generates tax estimation data 180, according to various embodiments of the present disclosure.

A sample customer entity 119 includes a computer 112, and a user 192 who may use computer 112. For example, the user 192 may be a seller of one or more items in one or more various jurisdictions, or a representative or agent of the seller. Both could be located within a physical site of the customer entity 119, but that is not necessary. More details about computer 112 are provided with reference to FIG. 2.

In this example, a network 194 is a communications network. In various embodiments, the network 194 may include one or more distinct computer networks, any of which may be any type of network, such as a local area network (LAN), a metropolitan area network (MAN), a wide area network (WAN), or the Internet. In some embodiments, network(s) 194 may colloquially be termed "the cloud," which as used herein may be considered to include the one or more computer networks as well as a plurality of networked computing devices and/or peripherals such as servers, routers, switches, etc. In certain embodiments, an Enterprise Resource Planning (ERP) system 121 may also be included within network 194 or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example in a peer-to-peer configuration, with the operations of the service distributed among them. The server computers may be located at a single geographic location or be distributed across multiple locations. Similarly, additional databases may be used for the service, and so on.

In the depicted embodiment, server computer 141 is configured, by software, to implement a service engine 142. Service engine 142 is configured to perform a predefined service. The service can be a computation, a search, a verification, a registration, a payment, a notification, generation of specialized information and so on. According to various embodiments of the present disclosure, the service may be determining or generating information regarding one or more estimations of taxes associated with a transaction of customer entity 119 in one or more tax jurisdictions. The generated tax estimation data 180 may be based, for example, on additional stored data regarding taxation regulations, individual jurisdictions associated with a proposed transaction, associated goods/services classification schedules, and other data, with some or all of such data being stored within database 146. In some embodiments, the transmission of such information may alert the customer entity 119 of one or more of the tax estimations.

In the context of FIG. 1, user 192 desires the service, and may even pay for it. User 192 uses computer 112 to access network 194 and, from network 194, to access software service platform 140. It will be appreciated that, in some contexts, service engine 142 performs cloud computing functionality and may be provided as software as a service (SaaS). Moreover, computer 112 can be viewed as a client computer from the perspective of software service platform 140.

The service provided by service engine 142 may be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to stored rules about one or more tax jurisdictions associated with a proposed transaction of the customer entity 119; a detected change or update to one or more products or services associated with a proposed transaction of the customer entity 119; a detected change or update to one or more classification schedules associated with such products or services; a detected change or update to an indicated risk tolerance specified by or otherwise associated with the customer entity 119 and/or with the proposed transaction; and one or more other conditions indicated by stored preferences of customer entity 119.

SE API 179 is configured to receive a request 171, which is shown as an arrow. Request 171 may be transmitted via network 194. Request 171 may have been ultimately caused to be generated by computer 112, for example as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may also include associated request data 172. When SE API 179 receives request 171 with its request data 172, it invokes service engine 142. When thus invoked, service engine 142 may perform its service using request data 172. In response, SE API 179 can be configured to transmit a response 174, also shown as an arrow. Response 174 may include response data 175 that arises out of the service, such as a computed result, a confirmation, and so on. Response 174 can be transmitted back to the sender of request 171, or as otherwise directed. In some embodiments, the request 171 may be automatically generated and transmitted, such as by the ERP system 121 and/or computer 112 in response to one or more various conditions being satisfied, including, but not limited to, one or more of: a detected change or update to stored rules about one or more tax jurisdictions associated with a proposed transaction of the customer entity 119; a detected change or update to one or more products or services associated with a proposed transaction of the customer entity 119; a detected change or update to one or more classification schedules associated with such products or services; a detected change or update to an indicated risk tolerance specified by or otherwise associated with the customer entity 119 and/or with the proposed transaction; and one or more other conditions indicated by stored preferences of customer entity 119.

In response to such a request being automatically generated, or in response to the service engine 142 invoking itself, the service engine 142 may generate and/or transmit tax estimation data 180. For example, tax estimation data 180 may be or include information regarding an estimation of taxes associated with a proposed transaction of customer entity 119, with the proposed transaction being for one or more products and/or services specified as taxable in accordance with regulations specified by one or more jurisdictions associated with the proposed transaction. In certain embodiments, the tax estimation data 180 may comprise a notification about the generation of the information, such as to alert the customer entity 119 of an update to the relevant estimation of taxes. In some embodiments, the tax estimation data 180 may be used to update information regarding a previously estimated taxation amount, such as in response to a change in risk tolerance specified by or otherwise associated with the customer entity 119. In certain embodiments, tax estimation information associated with the customer entity 119 and/or a potential transaction may be accessible by the customer entity 119 via a client computing device (e.g., the computer 112), with such information being presented on a user interface associated with the customer entity 119. Such a user interface may, in various embodiments, be a user interface of the server computer 141, computer 112, and/or a computer in ERP system 121, and so on. Furthermore, information associated with the customer entity 119 may be managed, stored and/or accessible by the server computer 141, computer 112, and/or a computer in ERP system 121, and so on.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided near the end of this description, in order to avoid interrupting the flow of this description at this stage.

Figure 2:
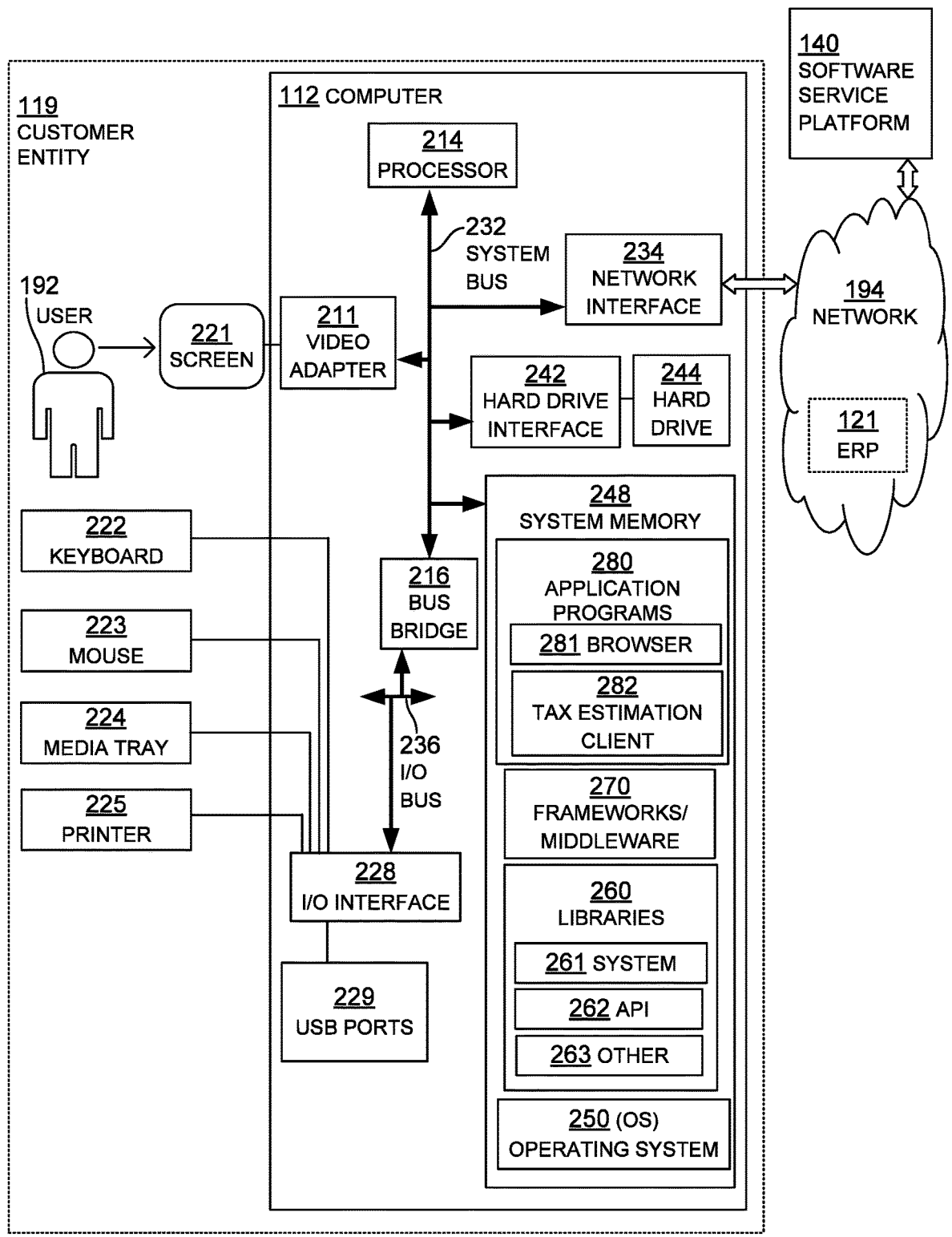
FIG. 2 is a block diagram showing more details of a computer of an exemplary customer entity of FIG. 1, with reference to the communication network and the software service platform, according to various embodiments of the present disclosure.

FIG. 2 is a block diagram showing more details of a computer 112 of an exemplary customer entity 119 of FIG. 1, with reference to the communication network 194 and the software service platform 140, according to various embodiments of the present disclosure.

FIG. 2 shows customer entity 119 of FIG. 1, along with more sample details for computer 112. In various embodiments, the computer 112 may be a desktop computer, a laptop computer, a tablet computer, a mobile phone or other mobile computing device, or any other computing device having appropriate communications and processing capabilities.

Computer 112 includes a processor 214. Computer 112 also includes a system bus 232 that is coupled to processor 214. System bus 232 can be used by processor 214 to control and/or communicate with other components of computer 112.

Computer 112 additionally includes a network interface 234 that is coupled to system bus 232. Network interface 234 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 234 can access network 194.

Also shown is a tax estimation client 282 residing in system memory 248, which may comprise computer-executable instructions executed by processor 214 to invoke or otherwise obtain services of the software service platform 140 provided by the service engine 142 running on server computer 141 of the software service platform 140. For example, the tax estimation client 282 may obtain and/or invoke the software service platform 140 to generate and/or transmit tax estimation data 180. In some embodiments, the tax estimation client 282 may generate a user interface for and/or provide access to an account associated with the customer entity 119 through which the tax estimation data 180 for the customer entity 119 may be accessible by the customer entity 119 via the computer 112. For example, updated information regarding taxes associated with a potential transaction of the customer entity 119 may be displayed via the tax estimation client 282 on a user interface associated with the account and/or the tax estimation client 282. The tax estimation client 282 may, in various embodiments, be part of or integrated with the browser 281. In other embodiments, the browser 281 may be or perform the operations of the tax estimation client 282, for example, when the software service platform 140 provides web-based services.

In some embodiments, the tax estimation client 282 may communicate and/or obtain services of ERP applications (e.g., ERP system 121), accounting applications, e-commerce applications and/or other applications remote from or resident on the computer 112. For example, the tax estimation client 282 may cause ERP system 121 to transmit a request or other information to the software service platform 140 that invokes services of the software service platform 140 to be provided to the tax estimation client 282 and/or ERP system 121. For example, such information may include data about the customer entity 119 (e.g., an entity of a seller); item data about an item that the seller offers for sale from a seller jurisdiction; order data about a prospective sale of the item by the seller to a buyer in a buyer jurisdiction distinct from the seller jurisdiction; and/or information indicative of a selection by the seller of a risk tolerance value (e.g., a selection between a plurality of risk tolerance values) on which an estimated tax due amount for the sale may be based. Such information may also include information indicative of one or more various conditions being satisfied, including, but not limited to, one or more of: a detected change or update to stored rules about one or more tax jurisdictions associated with a proposed transaction of the customer entity 119; a detected change or update to one or more products or services associated with a proposed transaction of the customer entity 119; a detected change or update to one or more classification schedules associated with such products or services; a detected change or update to an indicated risk tolerance specified by or otherwise associated with the customer entity 119 and/or with the proposed transaction; and one or more other conditions indicated by stored preferences of customer entity 119. As another example, the tax estimation client 282 may request, or cause ERP system 121 to request, transaction data regarding transactions or proposed transactions of the customer entity 119 from the ERP system 121, accounting applications, e-commerce applications and/or other applications for purposes of transmitting such transaction data to the software service platform 140, such that the software service platform 140 can use such data to determine tax estimation information for various jurisdictions or risk tolerance levels for the customer entity 119. In yet other embodiments, ERP system 121 may originate transmitting a request or transmitting of other information on behalf of customer entity 119.

Additional details regarding FIG. 2 are provided near the end of this description, in order to avoid interrupting the flow of this description at this stage.

Figure 3:
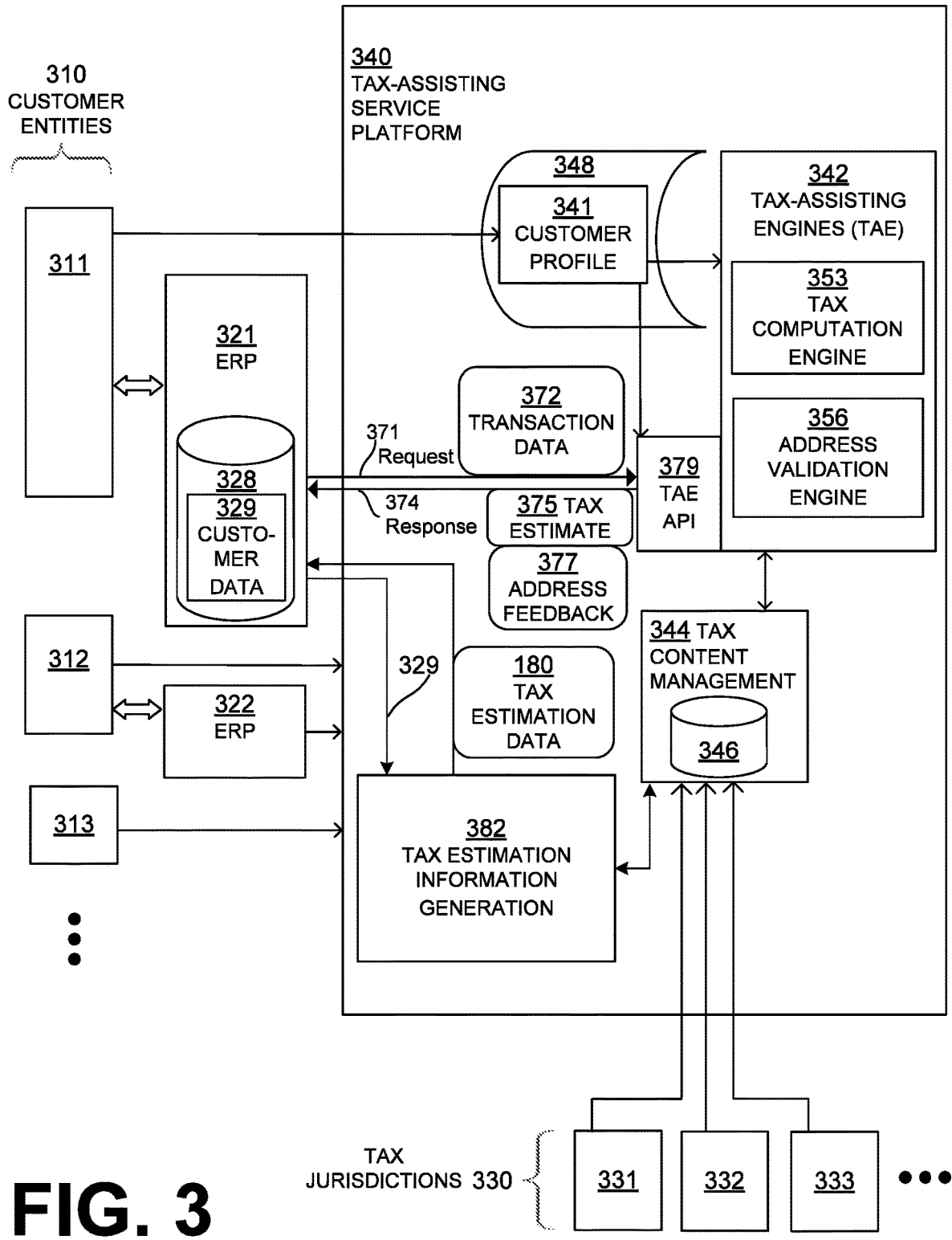
FIG. 3 is a block diagram showing an exemplary software architecture that includes an exemplary tax compliance information generation engine tax-assisting service platform according to various embodiments of the present disclosure.

FIG. 3 is a block diagram showing an exemplary software architecture working with a tax estimation information generation engine 382 in accordance with various embodiments of the present disclosure.

In this example, a software-implemented tax-assisting service platform 340 is configured to provide tax-related services. These services may include determining estimations of taxes associated with one or more transactions or proposed transactions of the customer entities 310, generating information regarding tax estimations associated with such transactions in various tax jurisdictions based on one or more risk tolerance levels specified or otherwise associated with the customer entities 310, and/or transmitting the information or one or more notifications about the generation of the information. Such notifications may include, as non-limiting examples, a notification to a particular customer entity 311 of an update or change to previously provided tax estimation information, such as based on one or more changes to a proposed transaction, to an indicated risk tolerance level, to a taxation schedule associated with one or more products or services included in a proposed transaction, etc. In some embodiments, these services may also include performing address validation for customer entities 310. Any one of sample customer entities 311, 312, 313, . . . may be as described for customer entity 119. These customer entities 310 may access a software-implemented tax-assisting service platform 340, for receiving its tax-related services.

Figure 4:
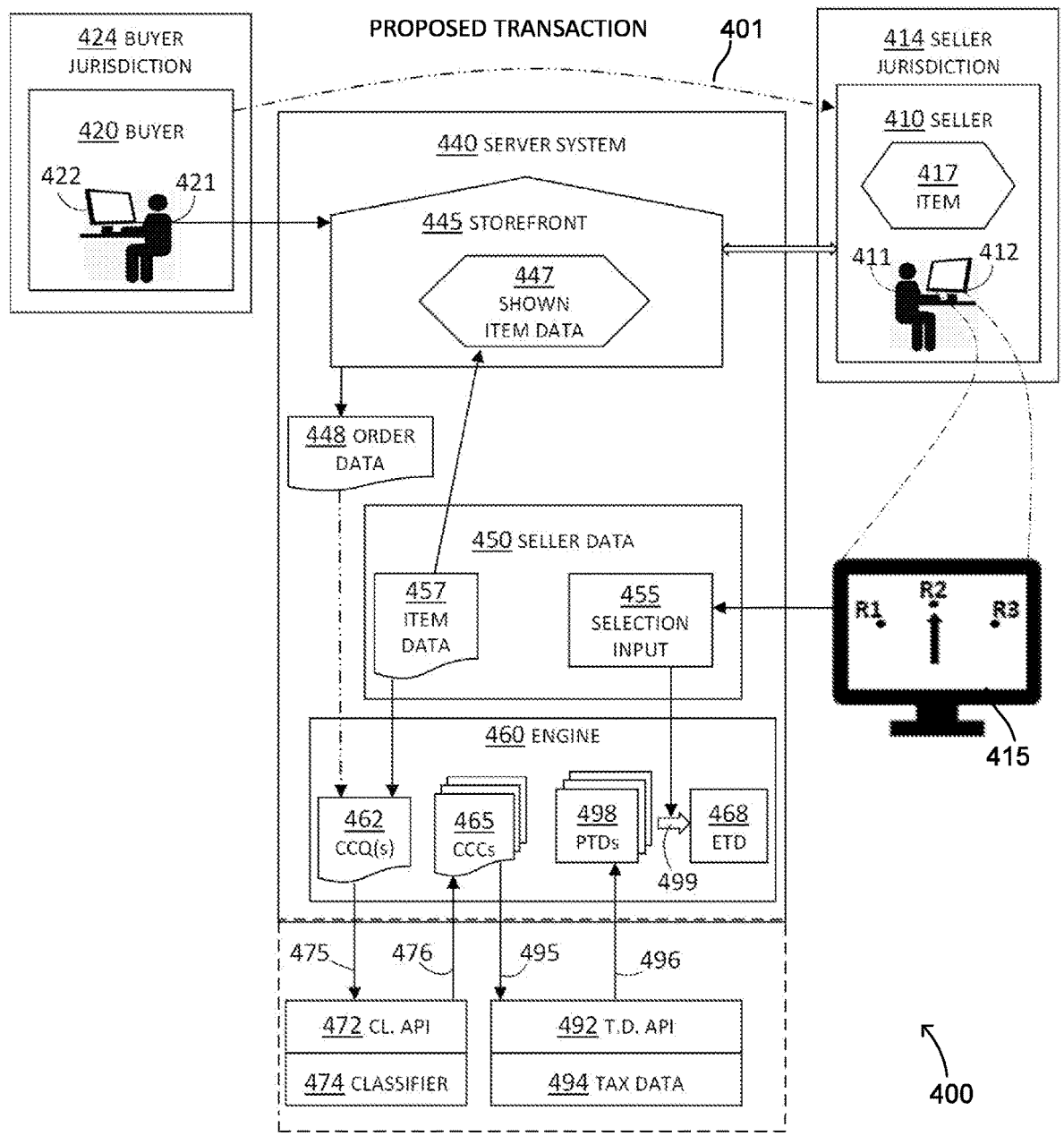
FIG. 4 is an operational block diagram depicting an exemplary scenario involving a taxable transaction across multiple jurisdictions in accordance with an embodiment of the present disclosure.

Aspects of FIG. 3 may be implemented by components described and shown elsewhere in this document, for example with reference to FIG. 1, FIG. 2, and FIG. 4. For instance, in some embodiments, customer entities 310 may access tax-assisting service platform 340 directly, as is shown by way of example for customer entity 313. In other embodiments, such access may occur at least in part indirectly, such as via Enterprise Resource Planning (ERP) systems 321, 322. In the depicted embodiment, ERP system 321 includes a database 328 that stores customer data 329 of customer entity 311, such as risk-tolerance information associated with the customer entity, various customer entity preferences, product or service information, and historical transaction data. In various embodiments, the customer data 329 may be used by the tax estimation information generation engine 382 data to determine estimated tax information associated with a transaction and various tax jurisdictions 330 for the customer entities 310. For example, in some embodiments, this estimated tax information may include one or more estimated tax due amounts associated with the transaction and communicated as or with the tax estimation data 180 to the customer entity 311 and/or to the tax computation engine 353 via the tax content management component 344. In the depicted embodiment, tax-assisting service platform 340 includes a database 348, and customer entity 311 has stored their own customer profile 341 in database 348.

In the depicted embodiment of FIG. 3, tax-assisting service platform 340 includes a tax content management component 344 for use by TAE 342 and the tax estimation information generation engine 382. Tax content management component 344 may receive tax information from one or more tax jurisdictions 330, such as sample tax jurisdictions 331, 332, 333, . . . . Tax content management component 344 includes a database 346 for storing the received tax information in the form of tax rules, rates, exemptions, product and service classification schedules, etc. For example, the database 346 may store rules regarding specific taxation amounts associated with specified products or services in the various tax jurisdictions 330. In some embodiments, the database 346 may further include information regarding descriptions of products and/or services, such as to assist the TAE 342 in determining particular taxation rates associated with specific products or services included in a proposed transaction.

Tax-assisting service platform 340 includes tax-assisting engines 342. In various embodiments, TAE 342 includes a tax computation engine 353, and may additionally include an address validation engine 356.

In the depicted embodiment, tax-assisting engines 342 may be invoked via a TAE Application Programming Interface (API) 379. Although only one TAE API 379 is shown implemented here, it will be appreciated that in certain embodiments multiple such programmatic interfaces may be implemented. For example, in an embodiment separate and distinct programmatic interfaces may be provided for invoking each of tax computation engine 353 and address validation engine 356. In this example, TAE API 379 is configured to receive a request 371 or other information from ERP 321. For example, in some embodiments, the Request 371 may include, be part of, initiate or comprise a request for an estimated tax due amount for a prospective sale of an item by the customer entity 311 to a buyer in a buyer jurisdiction distinct from the jurisdiction of the customer entity 311. Request 371 includes transaction data 372 of customer entity 311. Transaction data 372 may be retrieved from customer data 329 in database 328. In various embodiments, transaction data 372 may include, but is not limited to: data about the customer entity 119 (e.g., an entity of a seller); item data about an item that the seller offers for sale from a seller jurisdiction; order data about a prospective sale of the item by the seller to a buyer in a buyer jurisdiction distinct from the seller jurisdiction; and/or information indicative of a selection by the seller of a risk tolerance value (e.g., a selection between a plurality of risk tolerance values) on which an estimated tax due amount for the sale may be based. In various embodiments, transaction data 372 may also or instead be transmitted to one or more of the tax-assisting engines 342 in response to a request from the respective tax-assisting engine. In some embodiments, transaction data 372 may also or instead be provided to one or more of the tax-assisting engines 342 from one or more of the customer entities 310 and/or ERP system 321, such as in response to an option presented to the customer entity 311 of selecting between a plurality of risk tolerance values and/or in response to the customer data 329 being updated or changed, or on a periodic basis. In response to receiving request 371 with its transaction data 372, TAE API 379 invokes one of tax-assisting engines 342 to perform its service. Then, TAE API 379 is configured to transmit a response 374. Response 374 can be transmitted back to the sender of request 371, or otherwise.

In some embodiments, customer data 329 may be provided to the tax estimation information generation engine 382 from one or more of the customer entities 310 and/or ERP system 321, such as in response to the customer data 329 (including, in certain embodiments, associated risk-tolerance level information) being updated or changed, or on a periodic basis. In response to receiving this information the tax estimation information generation engine 382 may perform its service and send the tax estimation data 180. The tax estimation data 180 may be transmitted back to the sender of the customer data 329, to a corresponding customer entity 310, or otherwise.

In certain embodiments, the customer data 329 may be automatically generated and/or transmitted to the tax estimation information generation engine 382, such as by the ERP system 321 and/or one or more of the customer entities 310 in response to one or more various conditions being satisfied. In various embodiments, the tax estimation information generation engine 382 may also or instead automatically invoke itself to perform the applicable service in response to one or more various conditions being satisfied. In various embodiments, including those described above with respect to the customer data 329 being provided to the tax estimation information generation engine 382 via self-invocation or otherwise, non-limiting examples of such conditions may include one or more of: a detected change or update to stored rules about one or more tax jurisdictions, such as may be associated with a proposed transaction of one or more of the customer entities 310; a detected change or update to one or more products or services associated with a proposed transaction of one or more of the customer entities 310; a detected change or update to one or more tax classification schedules associated with such products or services; a detected change or update to an indicated risk tolerance specified by or otherwise associated with one or more of the customer entities 310, and/or with a transaction proposed by such entities; and one or more other conditions indicated by stored preferences of one or more of the customer entities 310. In certain embodiments, rules and/or product classification schedules associated with one or more of the jurisdictions 330 may be stored in the database 346 of the tax content management component 344, and accessible by the tax estimation information generation engine 382. Also, records of proposed or historical transactions for the customer entities 310 may comprise and/or be part of the customer data 329 and transmitted to the tax estimation information generation engine 382. The stored preferences of one or more of the customer entities 310 may also comprise and/or be part of the customer data 329, and may be transmitted to the tax estimation information generation engine 382.

In response to the customer data 329 being automatically generated and/or transmitted to the tax estimation information generation engine 382, or in response to the tax estimation information generation engine 382 invoking itself when certain conditions are satisfied, the tax estimation information generation engine 382 may generate and/or transmit tax estimation data 180 based on received customer data 329, including based on customer-specified or otherwise-indicated risk tolerance information.

If tax computation engine 353 is invoked by request 371, it may calculate a tax estimate of an amount of tax due for a proposed transaction, based on transaction data 372. In that case, response 374 includes a tax estimate 375 component that indicates the calculated amount. In various embodiments, such as those in which the tax estimation information generation engine 382 automatically invokes itself to perform the applicable service in response to one or more various conditions being satisfied, the tax estimation information generation engine 382 may invoke the tax computation engine 353 and the tax computation engine 353 may communicate the calculated amount (e.g., an estimated tax due amount) to the tax estimation information generation engine 382 via the tax content management component 344. The tax estimation information generation engine 382 may then communicate the calculated amount to the customer entity 311 as part of the tax estimation data 180.

If address validation engine 356 is thus invoked by request 371, it may perform an address-validation process, based on transaction data 372. In that case, response 374 includes a component of an address feedback 377. The latter can be a message that an address is valid, or not, or propose a different address.

In some embodiments, tax-assisting service platform 340 may perform a variety of services in addition to what is described above. As one example, tax-assisting service platform 340 may accumulate and store data regarding one or more past transactions associated with one or more of customer entities 310, and may further provide one or more analytical functions regarding such past transactions. As one non-limiting example, the tax-assisting service platform 340 may analyze accumulated data regarding past transactions for one or more customer entities in order to provide information regarding aggregated taxation estimates associated with various risk tolerance levels.

In another example, tax-assisting engines 342 and/or the tax estimation information generation engine 382 may further include one or more additional engines and/or functional components than are shown in the example of FIG. 3. Such additional engines and/or functional components, upon being invoked, can perform additional tax-related services, such as: a) register one or more of customers 310 with one or more appropriate tax jurisdictions 330, b) generate tax returns, i.e., prepare forms for filing by customer entities 310, c) file electronically such returns with the appropriate ones of tax jurisdiction(s) 330, and so on. In some embodiments, one or more of such services may be performed by the TAE 342 and/or the tax estimation information generation engine 382 for one or more of the customer entities 310, or a notification may be transmitted to one or more of the customer entities 310 that such services are available or recommended, in response to a determination by the tax estimation information generation engine 382 of a tax estimate associated with a proposed transaction for one or more of the customer entities 310.

FIG. 4 is a block diagram depicting an exemplary scenario 400 involving a prospective taxable transaction 401 across multiple jurisdictions in accordance with an embodiment of techniques described herein. In the depicted embodiment, a seller user 411 uses a seller computer 412 to engage in the proposed transaction 401 for the sale of one or more items 417 (hereafter simply "item" 417) with a buyer user 421 using a buyer computer 422. For ease of description, the seller user 411 and seller computer 412 shall be collectively referred to as seller 410, located in a seller jurisdiction 414; similarly, the buyer user 421 and buyer computer 422 shall be collectively referred to as buyer 420, located in a buyer jurisdiction 424. Both the seller 410 and buyer 420 are users of a server system 440, which facilitates the proposed transaction. For example, the seller 410 may be or correspond to the example customer entity 311 of FIG. 3.

In the depicted embodiment, the server system 440 comprises a storefront 445, seller data 450 regarding the seller 410, and one or more tax-assisting engines 460 (which may, in this and other embodiments, perform operations similar to those discussed elsewhere herein with respect to tax-assisting engines 342 of FIG. 3 and/or service engine 142 of FIG. 1). The server system 440 is communicatively coupled to the seller 410 and the buyer 420 via one or more computer networks (not shown for clarity), which in operation function in a manner similar or identical to computer network(s) 194 as described elsewhere herein with respect to FIGS. 1 and 2. In addition, the server system 440 is communicatively coupled to an item classifier engine 474 and a tax data engine 494. In various embodiments, either or both of the item classifier engine 474 and the tax data engine 494 may be incorporated within the server system 440. It will also be appreciated that in certain embodiments, the storefront 445 may be distinct from but communicatively coupled to the server system 440, such as in (but not limited to) embodiments in which a third-party storefront is communicatively coupled to the server system 440 in order to benefit from functionality provided by the tax-assisting engines 460.

During operation of the depicted embodiment, the server system 440 presents seller 410 with a selection of multiple possible taxation risk tolerance values R1, R2, and R3. In the exemplary scenario depicted herein, the possible taxation risk tolerance value R1 may be presented to the seller 410 as a "low-risk" option, the possible taxation risk tolerance value R2 may be presented to the seller 410 as a "medium-risk" option, and the possible taxation risk tolerance value R3 may be presented to the seller 410 as a "high-risk" option, respectively. In various scenarios and embodiments, these possible taxation risk tolerance values may be presented to the seller 410 responsive to an indication from the seller that the item 417 is to be sold by a storefront 445, may be presented to the seller 410 as a general user preference option to be associated with the seller with respect to some or all of the seller's transactions (via storefront 445 or one or more other distinct storefronts not shown), or at some other time or matter. In the example discussed here, the seller 410 provides a selection input 455 indicating a selection of R2 (the "medium-risk" option), and the server system 440 stores that selection input 455 as part of seller data 450, which also includes item data 457 regarding the particular item 417 for sale as part of proposed transaction 401.

In certain embodiments, the seller data 450 may include a variety of information regarding the seller 410. As non-limiting examples, the seller data 450 may include any or all of the following: contact information; payment information, such as bank account data, payment routing information, item availability information regarding one or more additional products for sale by seller 410, etc. In addition, the item data 457 may include a variety of information regarding one or more items for sale by the seller 410, including information regarding item 417 that is the subject of the proposed transaction 401. As non-limiting examples, the item data 457 may include any or all of the following: item pricing data; item classification data; item description data, including one or more coded hints that may in certain embodiments be used in whole or in part to determine item classification; item photographs, such as may be used in presentation to one or more prospective buyers of an item; item source data, such as may indicate a source jurisdiction from which the item may be sent, and/or a source jurisdiction in which the item was manufactured; etc. In the depicted embodiment, the item data 457 is used at least in part to provide the storefront 445 with shown item data 447, such as to present prospective buyers (including buyer 420) with information regarding items for sale by seller 410.

As a result of one or more interactions of the buyer 420 with the storefront 445, the storefront 445 generates order data 448, which includes data regarding the proposed purchase of item 417 by the buyer 420. The order data 448 is provided to tax-assisting engines 460.

In the depicted embodiment, responsive to receiving the order data 448, the tax-assisting engines 460 generate one or more classification code queries (CCQs) 462 and provide those classification code queries via interaction 475 to the item classifier engine 474 using the programmatic interface of classifier API 472. In response, the item classifier engine 474 provides (again via the classifier API 472) a plurality of classification code candidates (CCCs) 465 to the TAE 460 via interaction 476. In some embodiments, the CCCs correspond to "customs-grade" Harmonized Commodity Description and Coding Systems (HS) classification codes. In at least the depicted embodiment, each classification code candidate comprises an indication of a possible item classification code for item 417, such as may be used at least in part to determine a potential taxation amount due for the sale of that item 417 via proposed transaction 401. Responsive to the provided plurality of CCCs 465, the TAE 460 selects one or more of the CCCs 465 and provides the selected CCCs to tax data engine 494 via interaction 495, such as by using the programmatic interface of tax data API 492. In response to the selected CCCs 465 being provided to the tax data engine 494, the tax data engine provides (again via tax data API 492) multiple possible tax-due amounts 498 to TAE 460 via interaction 496. In various embodiments, each of the possible tax-due amounts 498 may correspond to one of the selected CCCs 465 that were provided to the tax data engine 494.

Responsive to receiving the multiple possible tax-due amounts 498, the TAE 460 determines, via process 499, an estimated taxation amount due (ETD) 468 based on those multiple possible tax-due amounts 498 and on the taxation risk tolerance value (in the depicted example, R2) selected by the seller 410 via the risk tolerance selection UI 415 and the resulting selection input 455. The determination of the ETD 468 based on the selected taxation risk tolerance value is discussed in greater detail below. In various example embodiments, the tax assisting engines 460, the item classifier engine 474 and/or the tax data engine 494 may be, correspond to, and/or be included as part of, the TAE 342 of FIG. 3. Also, some or all of the seller data 450, order data 448 and/or item data 457 may be, or be included in, the customer data 329 and/or transaction data 372 of FIG. 3.

Figure 5:
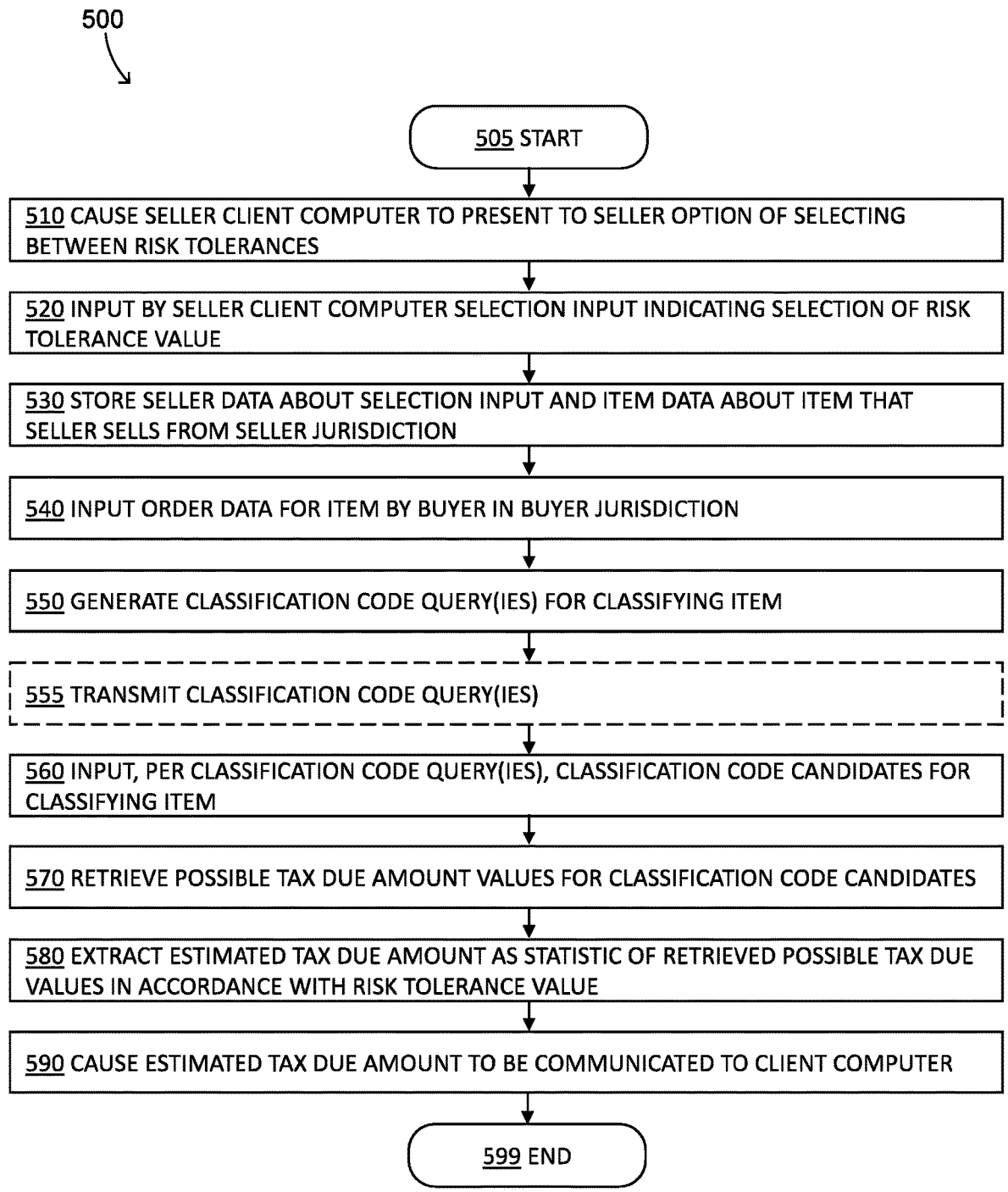
FIG. 5 is a flow diagram of an exemplary process for determining an estimated taxation amount due for a transaction in accordance with an indicated risk tolerance level and with various embodiments of the present disclosure.

FIG. 5 is a flow diagram of an exemplary process 500 for determining an estimated taxation amount due for a transaction in accordance with an indicated risk tolerance level. The depicted process begins at 505, and immediately proceeds to 510.

At 510, a processor-based system (such as server computer 141 of FIG. 1, software service platform 140 of FIG. 1 and FIG. 2, tax-assisting service platform 340 of FIG. 3, and/or server system 440 of FIG. 4) causes a client computer associated with a seller to present to that seller an option of selecting between multiple available risk tolerance values. As described in greater detail elsewhere herein, in various embodiments the multiple available risk tolerance values may be specified as a particular value by the seller (e.g., "70%"), selected from a finite quantity of available levels (such as "high," "medium," and "low"), or some other manner.

The process continues to 520, in which the processor-based system inputs from the seller's client computer an input indicating the seller's selection of an indicated risk tolerance value. As described in greater detail elsewhere herein, the indicated risk tolerance value may have been specified by the seller with respect to a particular proposed transaction, or have been selected at some prior time (such as a user preference associated for all proposed transactions respect to the particular seller).

At 530, the processor-based system stores seller data (such as seller data 450 of FIG. 4) that includes the indicated risk tolerance value (e.g., selection input 455 of FIG. 4), as well as item data (such as item data 457 of FIG. 4) regarding one or more items being sold by the seller from a jurisdiction in which the seller is located.

At 540, the processor-based system receives order data associated with a proposed transaction (such as, with reference to FIG. 4, receiving order data 448 from storefront 445 with respect to proposed transaction 401) for an order placed by a buyer from a jurisdiction in which the buyer is located.

At 550, the processor-based system generates one or more classification code queries for each of the one or more items that are the subject of the received order data so as to determine an appropriate classification for those items with respect to taxation amounts due for the sale of those items from the seller's jurisdiction to the buyer's jurisdiction. (It will be appreciated that in certain circumstances, the buyer and seller may be located in the same jurisdiction, and also that various taxation amounts due may nonetheless be associated with the proposed transaction regardless of that proximity.) In various embodiments, one or more of the classification code queries associated with an item that is the subject of the proposed transaction may be based on a jurisdiction in which the seller is located; on a jurisdiction in which the buyer is located; based on item description information or other information identified within the relevant item data (such as item data 457 of FIG. 4); on particular coded information (or "hints") embedded in such item data; on one or more previous transactions that included the same or similar item, either from the current seller or other entity; etc. Moreover, in certain embodiments the classification code queries may be based on one or more tables, databases, rules, or other information associated with an existing classification code scheme (such as, for example, one or more harmonized system codes and/or information associated therewith).

At 555, the processor-based system optionally transmits the generated classification code queries for the one or more items, such as to a separate item classifier engine. As noted elsewhere herein, the item classifier engine may, in certain embodiments, be incorporated within the processor-based system or located remotely from that processor-based system.

At 560, the processor-based system inputs, responsive to the classification code queries, a plurality of classification code candidates for classifying each of the one or more items that are the subject of the proposed transaction. For example, such classification code candidates may be received from the item classifier engine 474 of FIG. 4.

At 570, the processor-based system retrieves a possible tax-due amount value for each corresponding received classification code candidate, resulting in multiple possible tax-due amounts across a range of possible values. For example, the possible tax-due amount may be retrieved from the tax data engine 494 of FIG. 4.

At 580, the processor-based system extracts an estimated tax due amount based on a statistical computation associated with the taxation risk tolerance value selected by the seller for the proposed transaction. As discussed in greater detail elsewhere herein, in certain embodiments each selectable taxation risk tolerance value may be associated with a distinct statistical computation. For example, a "low" risk tolerance value may be associated with a statistical minimum of the multiple possible tax-due amounts; a "medium" risk tolerance value may be associated with a statistical median of the multiple possible tax-due amounts; a "high" risk tolerance value may be associated with a statistical maximum of the multiple possible tax-due amounts; etc. In various embodiments, a variety of such correspondences may be established between specific statistical computations and risk tolerance values by the processor-based system.

At 590, the processor-based system causes the estimated tax due amount to be communicated to a client computer (such as either or both of the buyer's client computer and a client computer associated with the seller). In various embodiments, the estimated tax due amount may be communicated in various ways. For example, the estimated tax due amount may be presented to the seller and/or buyer explicitly and separately, or may be presented as part of a "total" amount that incorporates both the estimated tax due amount and one or more other quantities, such as prices for the individual one or more items that are the subject of the proposed transaction.

Following the presentation of the estimated tax due amount, the process continues to 599 and ends.

FIGS. 6A-6E are block diagrams depicting an exemplary determination of an estimated taxation amount due for a transaction in accordance with various indicated risk tolerance levels.

Figure 6A:
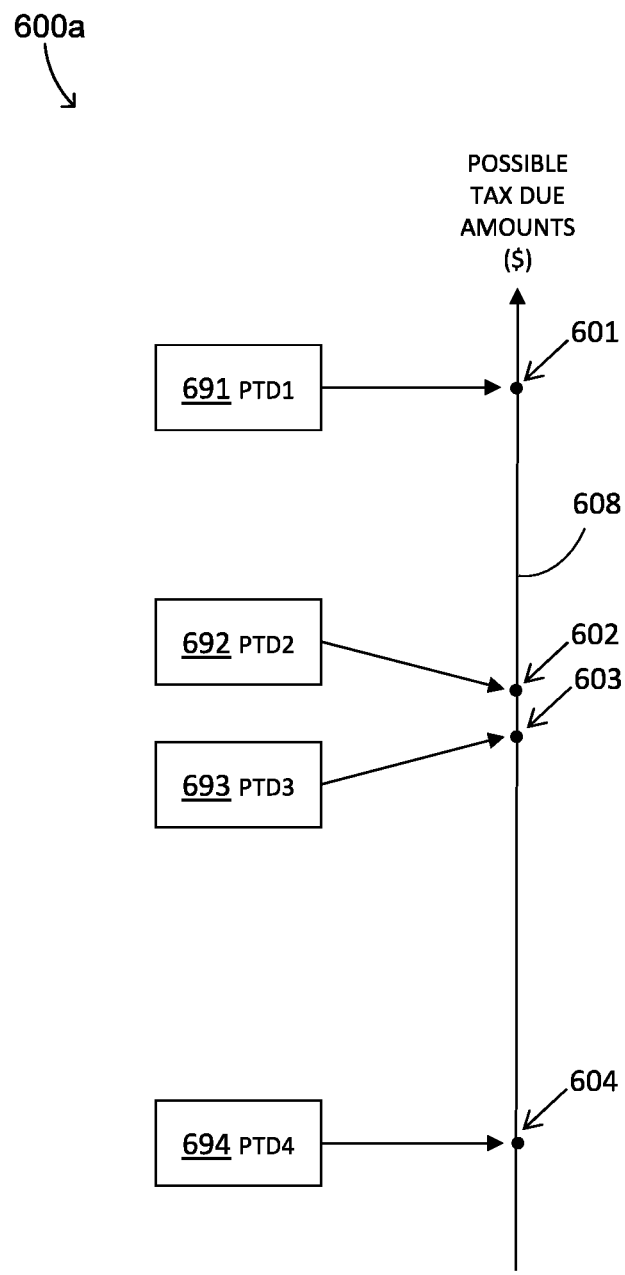
FIGS. 6A-6E are block diagrams depicting an exemplary determination of an estimated taxation amount due for a transaction in accordance with various indicated risk tolerance levels and with various embodiments of the present disclosure.

FIG. 6A depicts a tax determination scenario 600a, in which various values are placed on an axis 608 of possible tax due amounts associated with a proposed transaction, such as proposed transaction 401 of FIG. 4. While no monetary values are identified numerically along the axis 608, it will be appreciated that values placed spatially higher on that axis represent monetary values greater than those values placed spatially lower on that same axis. In the depicted example, multiple possible tax-due amounts (PTDs) have been identified in response to a plurality of classification code candidates received in association with an item that is the subject of the proposed transaction. In particular, a PTD1 691 comprises a relatively high value located at 601 on the axis 608; a PTD2 692 comprises a lower value located at 602 on the axis 608; a PTD3 693 comprises a still lower value located at 603 on the axis 608; and a PTD4 694 comprises the lowest possible identified value, located at 604 on the axis 608.

Figure 6B:
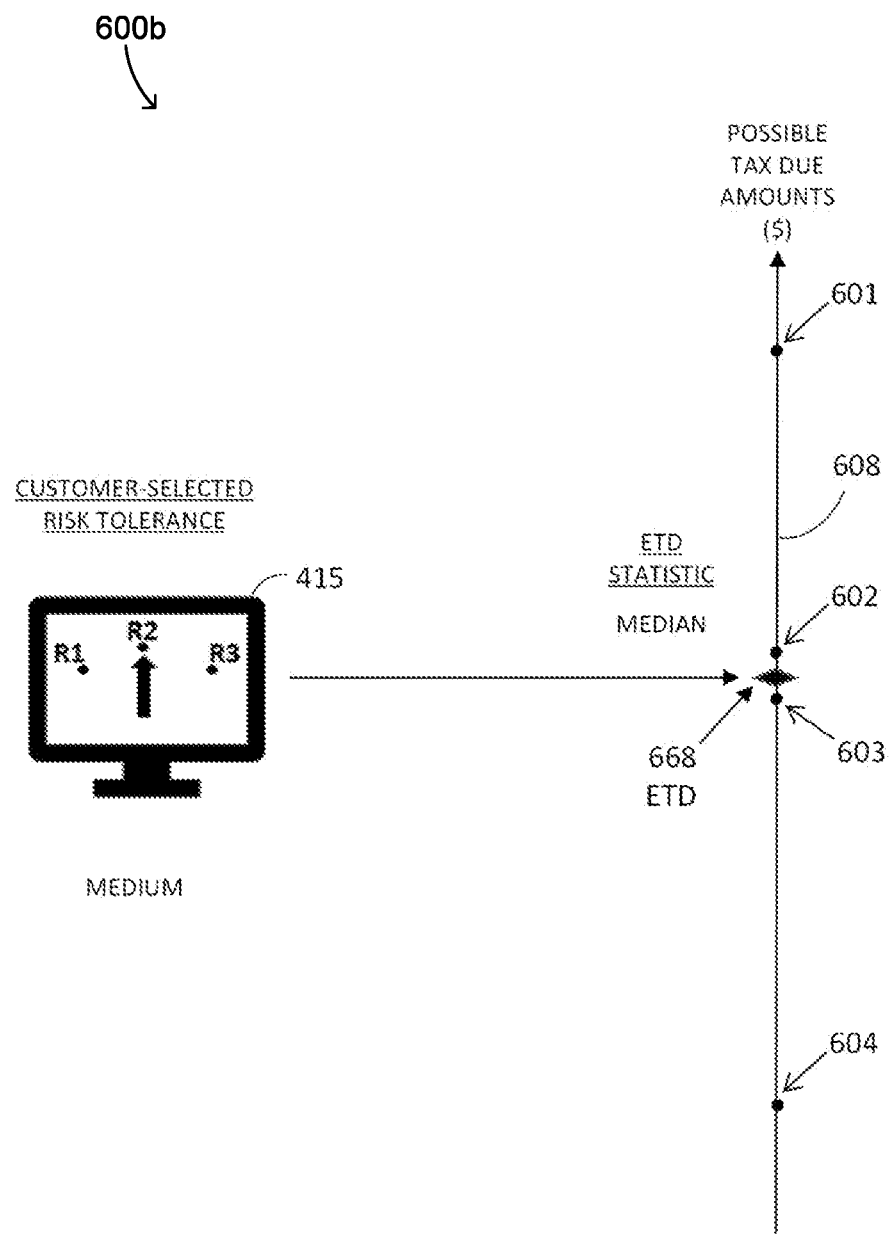

Continuing to FIG. 6B, which depicts a second tax determination scenario 600b in which a customer-selected risk tolerance value 415 is used to determine a particular estimated tax due amount (ETD) 668 based on the multiple identified possible tax-due amounts. In this example, the customer has selected a "medium" risk tolerance value R2, which has been selected as corresponding to a statistical median. As a result, ETD 668 is calculated as the statistical median of the monetary values 601, 602, 603, and 604 (which, as described above with respect to FIG. 6A, correspond to the respective possible tax-due amounts PTD1, PTD2, PTD3, and PTD4). In this case, since there is an even number (four) of data points 601, 602, 603, 604, the median is the average of the middle two data points 602, 603.

Figure 6C:
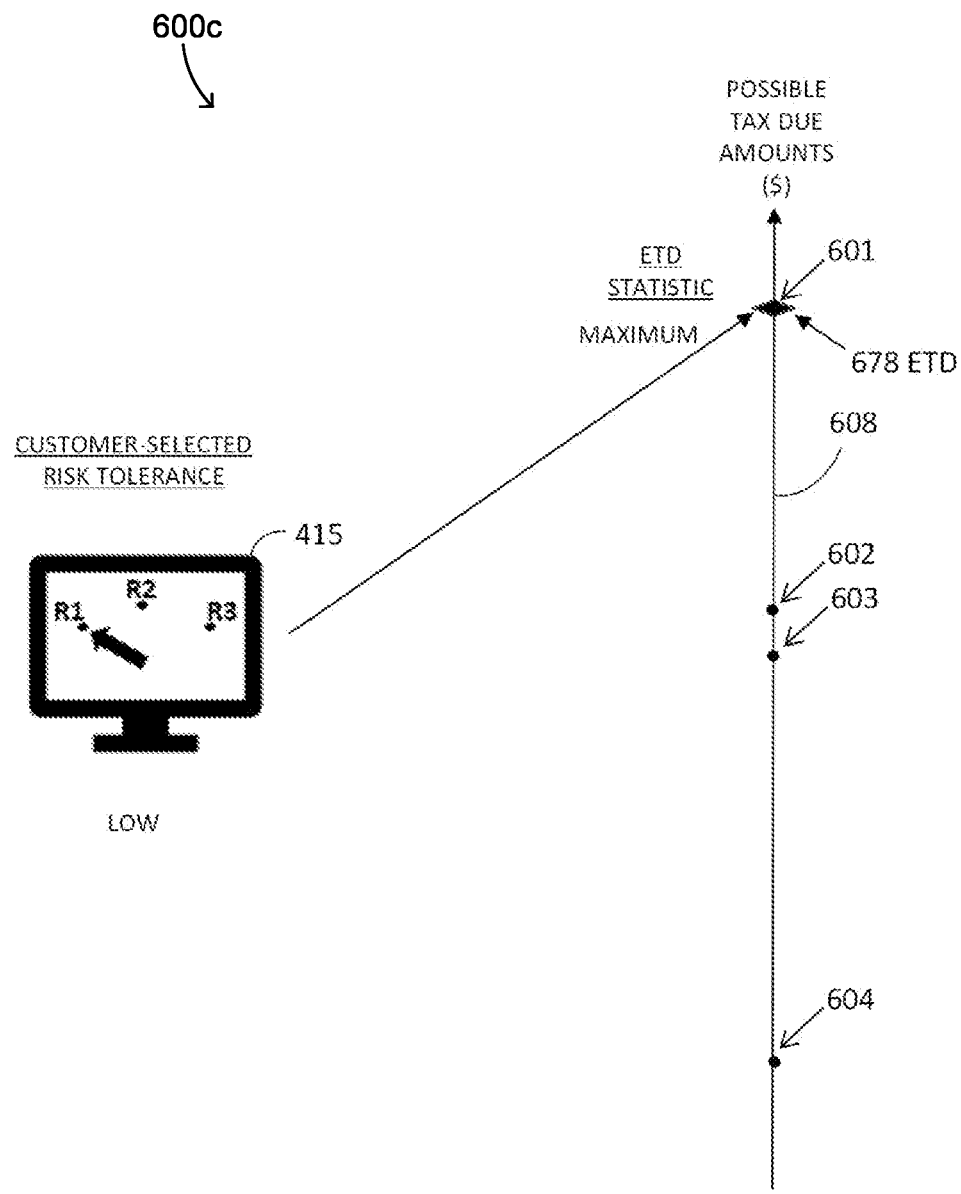

FIG. 6C depicts a third tax determination scenario 600c, in which the customer has selected a "low" risk tolerance value R1, again used to determine a particular estimated tax due amount 678 based on the multiple identified possible tax-due amounts. In this example, the "low" risk tolerance value R1 corresponds to a statistical maximum. As a result, ETD 678 is calculated as the statistical maximum of the monetary values 601, 602, 603, and 604 respectively identified and placed along axis 608 (which again, as described above with respect to FIG. 6A, correspond to the respective possible tax-due amounts PTD1, PTD2, PTD3, and PTD4). In the present example, this statistical maximum is value 601.

Figure 6D:
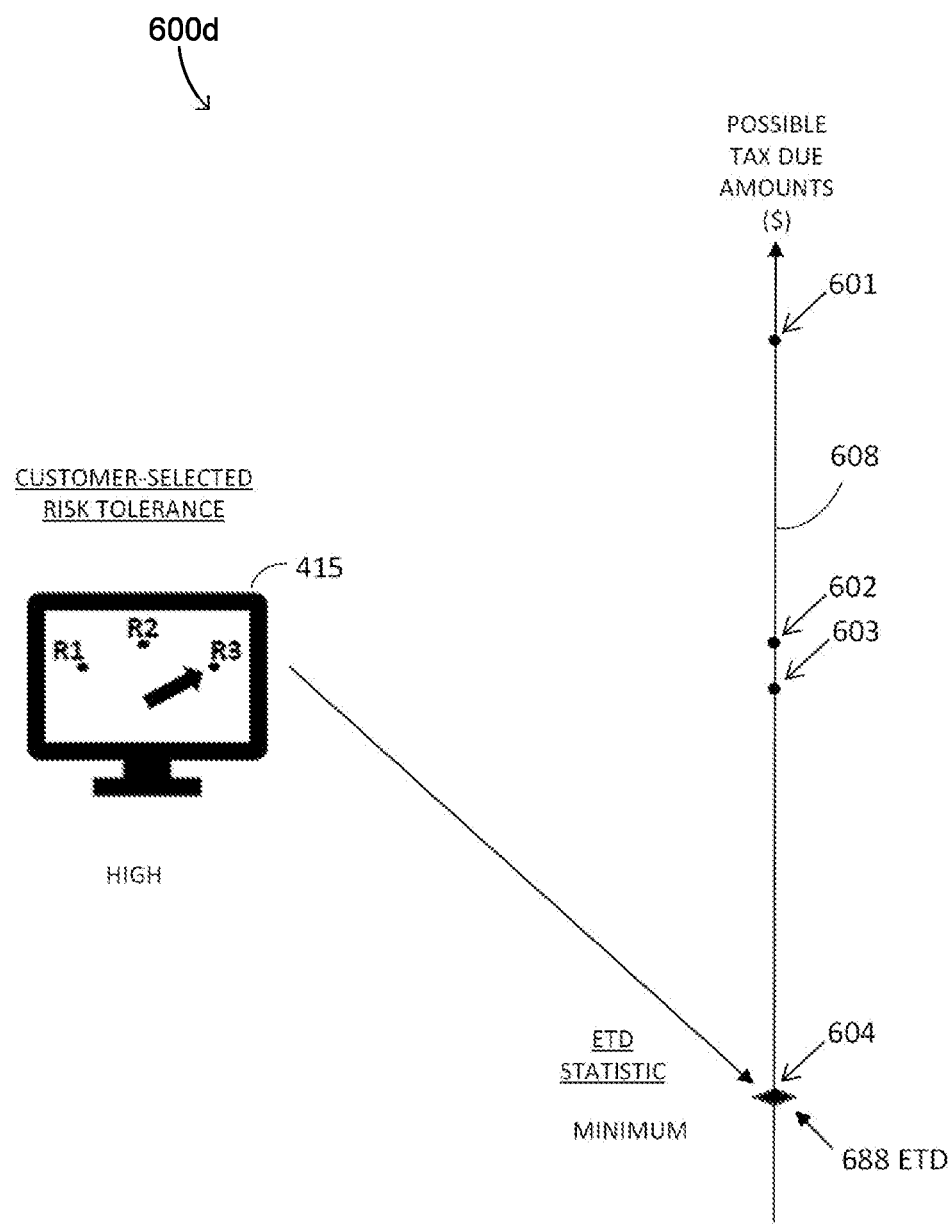

FIG. 6D depicts a fourth tax determination scenario 600d, in which the customer has selected a "high" risk tolerance value R3, again used to determine a particular estimated tax due amount 678 based on the multiple identified possible tax-due amounts. In this example, the "high" risk tolerance value R3 corresponds to a statistical minimum. As a result, ETD 688 is calculated as the statistical minimum (value 604) of the monetary values 601, 602, 603, and 604 respectively identified and placed along axis 608 (which again, as described above with respect to FIG. 6A, correspond to the respective possible tax-due amounts PTD1, PTD2, PTD3, and PTD4). In the present example, this statistical minimum is value 604.

Figure 6E:
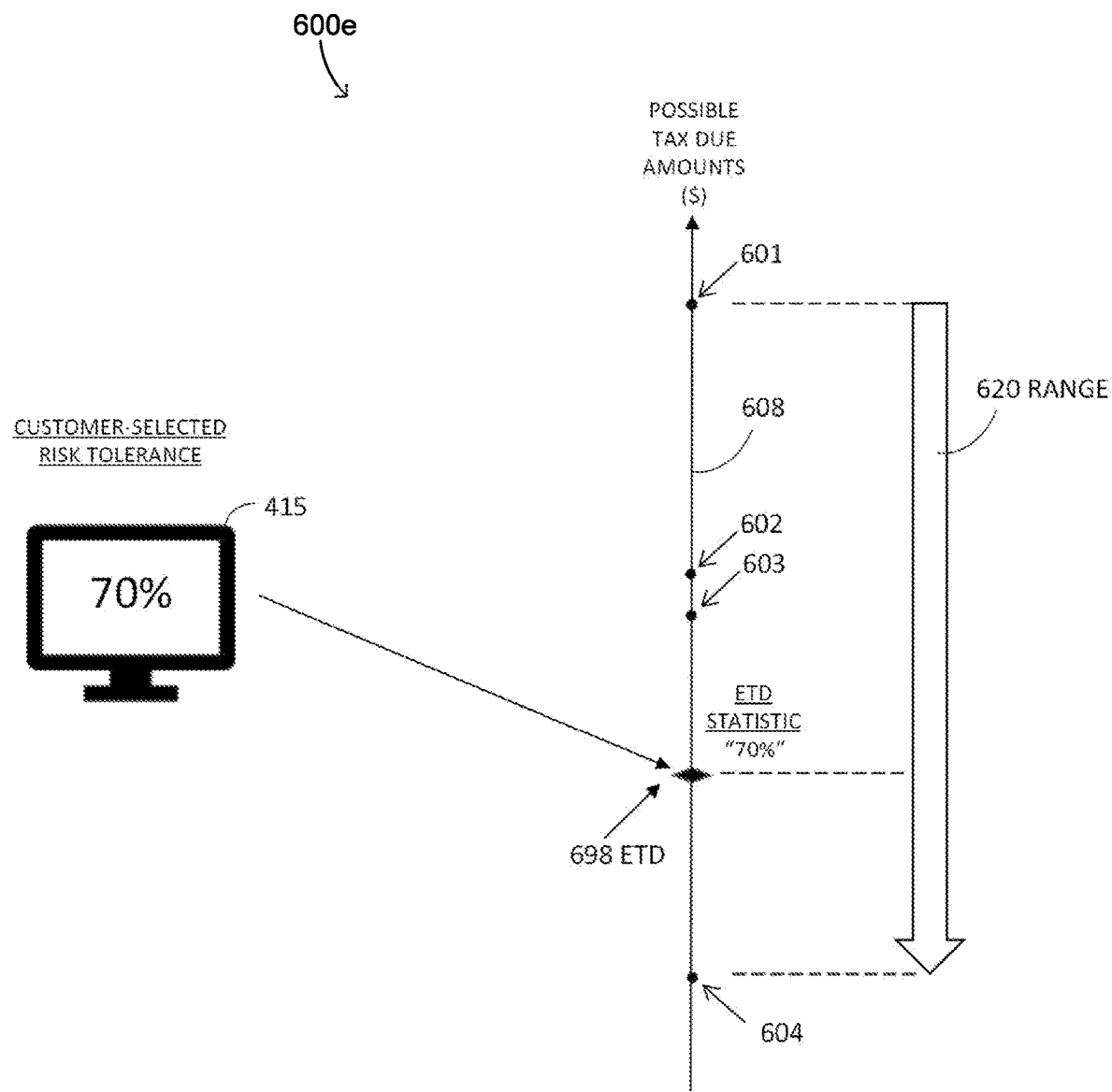

FIG. 6E depicts a fifth tax determination scenario 600e, in which the customer has specified a risk tolerance value of "70%." This specified risk tolerance value is again used to determine a particular estimated tax due amount 678 based on the multiple identified possible tax-due amounts. In this example, the risk tolerance value of 70% corresponds to a statistical multiplier for determination of the ETD 698 within a range 620 of the monetary values 601, 602, 603, and 604 respectively identified and placed along axis 608 (which again correspond to the respective possible tax-due amounts PTD1, PTD2, PTD3, and PTD4). It will be appreciated that the specified risk tolerance value increases inversely within the range 620 of possible tax-due amounts; that is, the lower the risk tolerance value specified, the greater the determined ETD is calculated within the range 620.

Figure 7A:
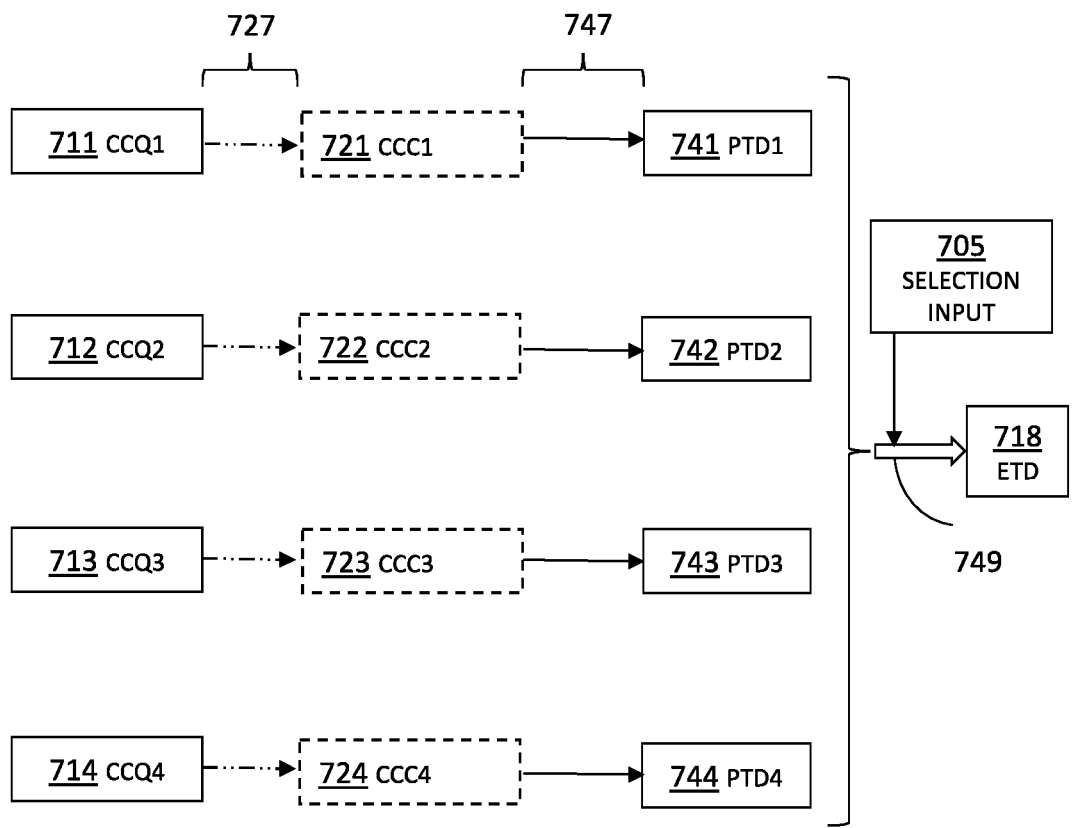
FIG. 7A is a block diagram depicting how multiple classification code queries may result in respective classification code candidates in an exemplary process for determining an estimated taxation due amount in accordance with various embodiments of the present disclosure.

FIG. 7A is a block diagram depicting how multiple classification code queries may generate respective classification code candidates in an exemplary process for determining an estimated tax due amount 718. In particular, FIG. 7A depicts the determination of the estimated tax-due amount 718 based on a plurality of classification code queries generated by one or more tax-assisting engines of a processor-based system, as well as with a plurality of possible tax-due amounts based on those classification code queries.

In the depicted example, a set of four classification code queries (CCQ1 711, CCQ2 712, CCQ3 713, and CCQ4 714) are provided to an item classifier engine (which may correspond to item classifier engine 474 of FIG. 4) via an interaction 727 (which in certain embodiments may be performed in a manner similar to that described with respect to interaction 475 of FIG. 4). In turn, the item classifier engine may provide a corresponding set of classification code candidates (CCC1 721, CCC2 722, CCC3 723, and CCC4 724, respectively) via an interaction 727 (which in certain embodiments may be performed in a manner similar to that described with respect to interaction 476 of FIG. 4). In turn, via an interaction 747 (which in certain embodiments may be performed in a manner similar to that described with respect to interactions 495 and/or 496 of FIG. 4) that can be performed in response to receiving the set of classification code candidates, the TAE may retrieve corresponding possible tax-due amounts PTD1 741, PTD2 742, PTD3 743, and PTD4 744. In various embodiments, the resulting plurality of possible tax-due amounts may be used as the basis of a process 749 for calculating ETD 718 based at least in part on an indicated risk tolerance value (e.g., selection input 705) in a manner similar to that described above with respect to FIGS. 6A-6E.

Figure 7B:
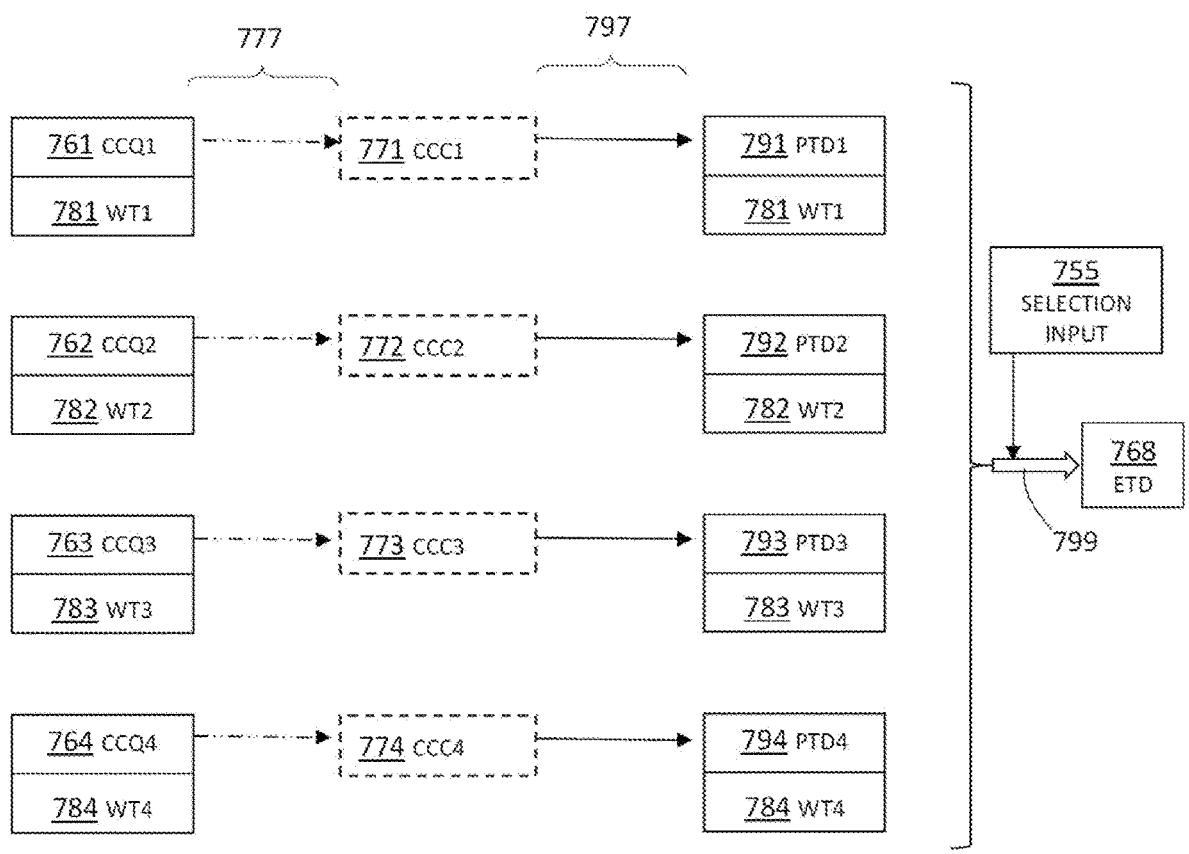
FIG. 7B is a block diagram depicting how multiple classification code queries may result in respective classification code candidates in an exemplary process for determining an estimated taxation amount due using respective probability weights associated with classification code queries for a transaction in accordance with various embodiments of the present disclosure.

FIG. 7B is a block diagram depicting how multiple classification code queries may generate respective classification code candidates in an exemplary process for determining an estimated taxation due amount 768 using respective probability weights associated with classification code queries for a transaction. In particular, FIG. 7B depicts the determination of the estimated tax-due amount 768 based on a variety of distinct weights associated with a plurality of classification code queries generated by one or more tax-assisting engines of a processor-based system, as well as with a plurality of possible tax-due amounts based on those classification code queries.

In the depicted example, a set of four classification code queries (CCQ1 761, CCQ2 762, CCQ3 763, and CCQ4 764) are each associated with a distinct weight (WT1 781, WT2 782, WT3 783, and WT4 784, respectively) representing a determined probability and/or confidence value for the respectively associated classification code query. For example, the probability and/or confidence value may be determined according to a relative confidence in creating the respective query. Via an interaction 777 (which in certain embodiments may be performed in a manner similar to that described with respect to interaction 475 of FIG. 4), the set of four classification code queries is provided to an item classifier engine (which may correspond to item classifier engine 474 of FIG. 4), which in turn provides a corresponding set of classification code candidates (CCC1 771, CCC2 772, CCC3 773, and CCC4 774, respectively). In turn, via an interaction 797 (which in certain embodiments may be performed in a manner similar to that described with respect to interactions 495 and/or 496 of FIG. 4) that can be performed in response to receiving the set of classification code candidates, the TAE may retrieve corresponding possible tax-due amounts PTD1 791, PTD2 792, PTD3 793, and PTD4 794. In the depicted embodiment, the TAE then adjusts the retrieved possible tax due amounts in accordance with the probability weights WT1 781, WT2 782, WT3 783, WT4 784 respectively associated with the corresponding classification code queries. As one non-limiting example, the associated probability weights may be specified or normalized to a range (such as between 0 and 1), and may be multiplied by the corresponding identified PTD to arrive at a plurality of possible tax-due amounts. In various embodiments, the resulting plurality of possible tax-due amounts may be used as the basis of a process 799 for calculating ETD 768 directly, or may be used (as described below with respect to FIG. 8) in conjunction with an indicated risk tolerance value (e.g., selection input 755) in a manner similar to that described above with respect to FIGS. 6A-6E.

Figure 8:
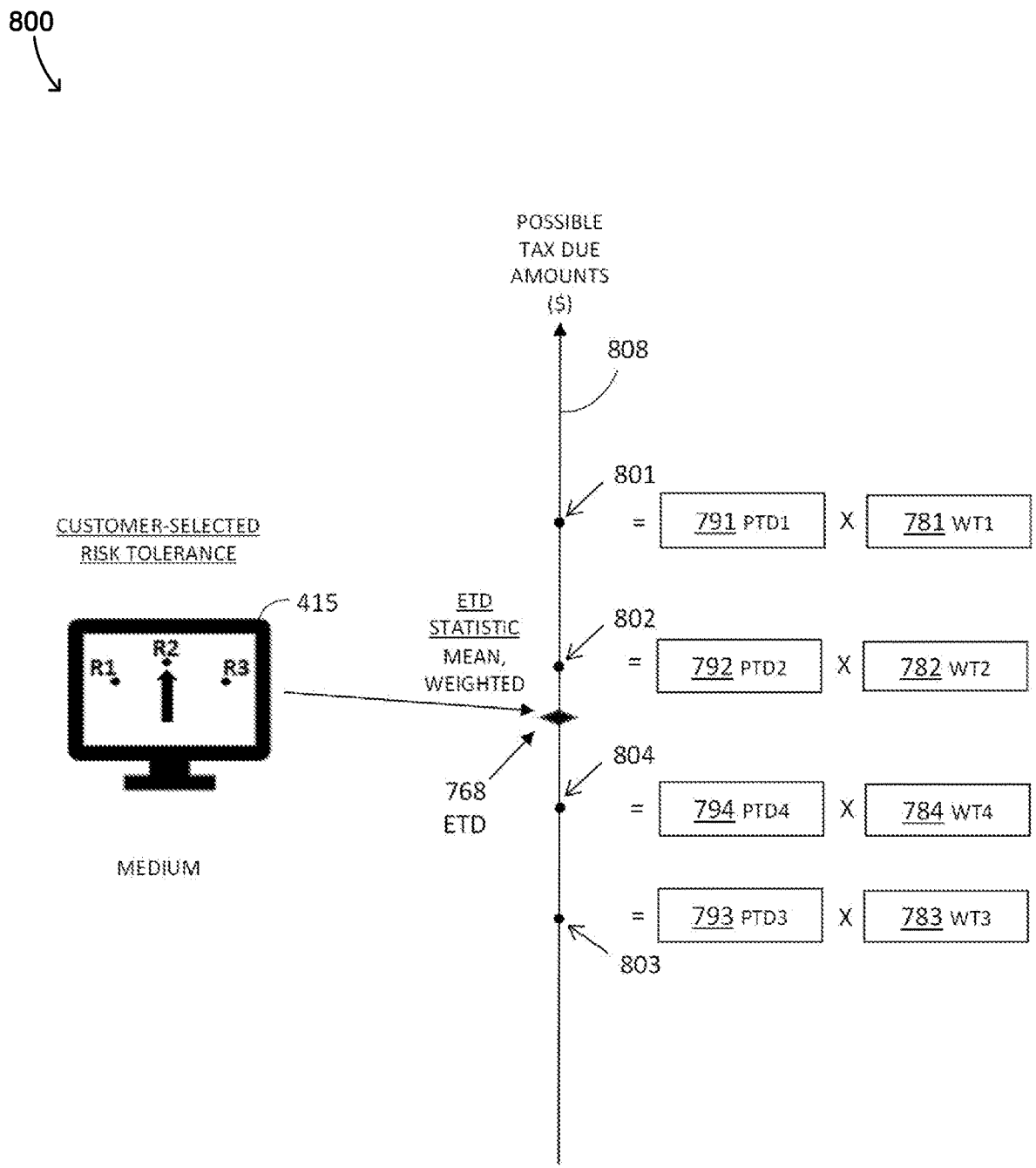
FIG. 8 is a block diagram depicting an exemplary determination of an estimated taxation amount due for a transaction in accordance with an indicated risk tolerance level and in accordance with an embodiment of the present disclosure.

FIG. 8 is a block diagram depicting a tax determination scenario 800 in which an estimated taxation amount due (ETD 768) is determined for a transaction in accordance with an indicated risk tolerance level and in accordance with an embodiment of the present disclosure. In the depicted example, the customer has selected a "medium" risk tolerance value R2, which has been selected as corresponding to a weighted statistical mean. The weighted statistical mean is used to calculate a particular estimated tax due amount (ETD) 768 based on multiple identified possible tax-due amounts, respectively placed upon a monetary axis 808 at points 801, 802, 803, and 804. Each of the monetary values corresponding to points 801, 802, 803, and 804 represents one of a plurality of probability weights (WT1 781, WT2 782, WT3 783, and WT4 784) respectively combined with (e.g., multiplied by) a corresponding one of a similar plurality of identified possible tax-due amounts (PTD1 791, PTD2 792, PTD3 793, and PTD4 794). For example, the ETD 768 may be, or be based on, the average of the middle two data points 802, 804.

Figure 9:
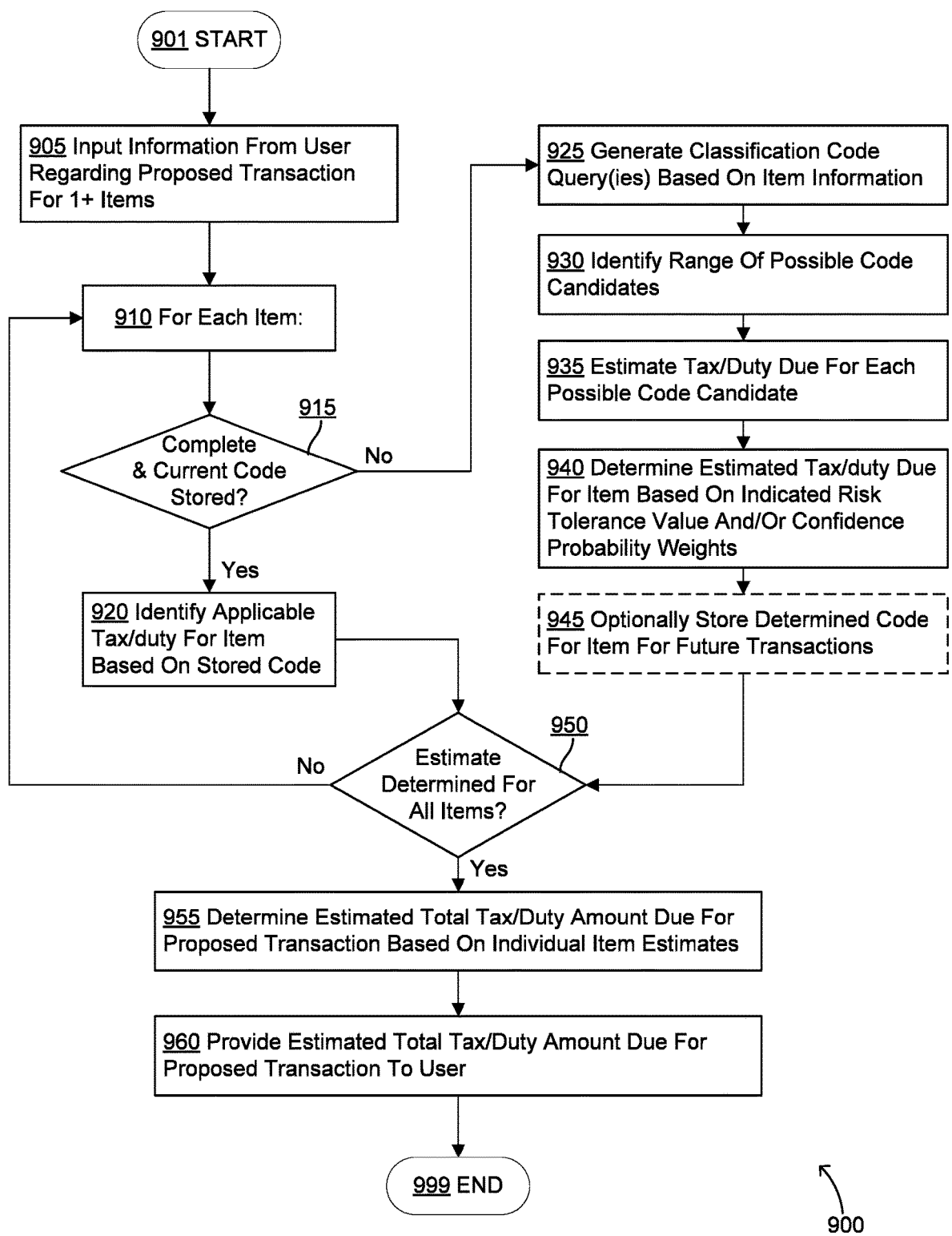
FIG. 9 is a flow diagram of another exemplary process for determining an estimated taxation amount due for a transaction in accordance with an indicated risk tolerance level and with various embodiments of the present disclosure.

FIG. 9 is a flow diagram of another exemplary process 900 for determining an estimated taxation amount due for a proposed transaction in accordance with an indicated risk tolerance level. The depicted process begins at 901, and immediately proceeds to 905.

At 905, a processor-based system (such as server computer 141 of FIG. 1, software service platform 140 of FIG. 1 and FIG. 2, tax-assisting service platform 340 of FIG. 3, and/or server system 440 of FIG. 4) causes a client computer associated with a user to input information from that user regarding a proposed transaction for one or more items. As noted elsewhere herein, in various embodiments the input information may include a variety of information about the one or more items that are the subject of the proposed transaction, including an indicated risk tolerance value associated with the user, the proposed transaction, etc. The process continues to 910.

At 910, the processor-based system initiates determining an estimation of a taxation amount due for each item that is a subject of the proposed transaction. Such determining begins at 915, in which the processor-based system determines whether a complete and current item code (such as, by way of a non-limiting example, an HS code) is stored for the item, such as if the item has been a subject of a previous transaction in which the relevant item code was determined and stored for future use.

If it is determined by the processor-based system that the item is associated with existing stored item code, the process continues to 920, in which the processor-based system identifies the applicable taxation amount due for the item based on the stored item code.

Alternatively, if it is determined by the processor-based system that a complete and current item code is not already stored in association with the item, the processor-based system proceeds to 925, and generates one or more classification code queries based on information associated with the item. As discussed in greater detail elsewhere herein, in various embodiments such item information may include item pricing data, item classification data, item description data, item photographs, item source data, and other information. The process continues to 930.

At 930, the processor-based system identifies a set or range of possible code candidates that may be associated with the item based on the one or more generated classification code queries, and then proceeds to 935, in which the processor-based system estimates a taxation amount due for each identified possible code candidate. The process then continues to 940.

At 940, the processor-based system determines an estimated taxation amount due for the item, based on the estimated amounts associated with each identified possible code candidate and using the indicated risk tolerance value. In certain embodiments, the processor-based system may use one or more confidence probability weights in a manner similar to that described with respect to the determination of ETD 768 in FIG. 7B.

At 945, the processor-based system may optionally store a determined item code for the item, such as for use in future transactions, and then proceeds to 950.

Following 920 or 945, the processor-based system determines at 950 whether a taxation amount due estimate has been determined for all of the one or more items that are the subjects of the proposed transaction. If not, the process returns to 910 in order to evaluate the next item in the proposed transaction; otherwise, the process continues to 955.

At 955, the processor-based system determines an estimated total taxation amount due for the proposed transaction based on the individual estimates for each of the items that are the subject of that transaction. The process then continues to 960, in which the processor-based system provides to the user the estimated total taxation amount due for the proposed transaction.

After providing the total estimate for the proposed transaction, the process continues to 999 and ends.

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include—starting from the bottom—an operating system (OS) 250, libraries 260, frameworks/middleware 270 and application programs 280. Other software architectures may include less, more or different layers. For example, a presentation layer may also be included. For another example, some mobile or special purpose operating systems may not provide a frameworks/middleware 270.

The OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPEG4, H.264, MP3, AAC, AMR, JPG, and PNG. API libraries 262 may also include graphics libraries, for instance an OpenGL framework that may be used to render 2D and 3D in a graphic content on screen 221. API libraries 262 may further include database libraries, for instance SQLite, which may support various relational database functions. API libraries 262 may additionally include web libraries, for instance WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 281. Browser 281 is an example of a renderer, which includes program modules and instructions that enable computer 112, to exchange network messages with network 194 using hypertext transfer protocol (HTTP) messaging.

Other such applications 280 may include a contacts application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 214. Accordingly, these memory components are examples of machine-readable media.

As used herein, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor components referenced herein, such as including but not necessarily limited to processor 214, as well as the respective processors of server computer 141 and/or server system 440, are physical circuits that manipulate physical quantities representing data values. The manipulation can be according to control signals, which can be known as commands, operation (or "op") codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors (or "cores") that execute instructions.

Hardware components described herein, such as a processor, may include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Importantly, although the operational and/or functional descriptions of this document are understandable by the human mind, they are not abstract ideas of the operations/functions divorced from computational implementation of those operations/functions. Rather, the operations/functions represent a specification for complex computational machines or other means. As discussed in detail elsewhere in this document, each time the operational/functional language must be read in its proper technological context, i.e., as concrete specifications for physical implementations. Far from being understood as an abstract idea, it can be recognized that a functional/operational technical description is a human-understandable representation of one or more almost unimaginably complex and time-sequenced hardware and/or software instantiations.

Moreover, the methods, algorithms, operations, functions and acts described in this document are not necessarily inherently associated with any particular logic device or other apparatus. Rather, they are advantageously implemented by programs for use by one or more specific devices and/or systems referenced herein. These algorithms are not necessarily purely mathematical, and are configured to address challenges particular to the problem solved, as will be apparent to a person skilled in the art.

This detailed description includes flowcharts, display images, algorithms, and symbolic representations of program operations within at least one computer readable medium. An economy may be achieved in that a single set of flowcharts can be used to describe both programs, and also methods. So, while flowcharts describe methods in terms of boxes, they may also concurrently describe programs.

In the methods described above, each operation can be performed as an affirmative step of doing, or causing to happen, what is written that can take place. Such performance or causation may be by the whole system or device, or by one or more components thereof. In addition, the order of operations is not constrained to what is shown, and different orders may be possible according to different embodiments. Moreover, in certain embodiments, additional operations may be added, individual operations may be modified or deleted, or some combination thereof.

This description includes one or more examples, but that does not limit how the disclosed inventive techniques may be practiced. Indeed, examples or embodiments of techniques described herein may be practiced according to what is described, or differently, and also in conjunction with other present or future technologies. Other embodiments include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

A person skilled in the art will be able to practice the present inventive techniques in view of this description, which is to be taken as a whole. Details have been included to provide a thorough understanding. In other instances, well-known aspects have not been described, in order to not obscure unnecessarily the present disclosure. Plus, any reference to any prior art in this description is not, and should not be taken as, an acknowledgement or any form of suggestion that this prior art forms parts of the common general knowledge in any country.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for a server system, the method including at least:
causing a seller client computer distinct from the server system to present to a seller an option, via a specialized graphical user interface (GUI), of selecting between a first risk tolerance value and a second risk tolerance value that is distinct from the first risk tolerance value, by at least generating the specialized GUI including a graphical depiction of the option between the first risk tolerance value and the second risk tolerance value as one or more selectable specialized GUI elements;
inputting from the seller client computer, in response to an electronic selection made via the one or more selectable specialized GUI elements the presented option, a selection input indicating a selection by the seller of one of the first risk tolerance value and the second risk tolerance value;
storing seller data about the seller, the seller data including the selection input and item data about an item that the seller offers for sale from a seller jurisdiction;
inputting order data about a prospective sale of the item by the seller to a buyer in a buyer jurisdiction distinct from the seller jurisdiction;
generating, from the order data, one or more classification code queries for classifying the item for the prospective sale;
inputting, responsive to the one or more classification code queries, a plurality of classification code candidates that are potentially applicable for classifying the item for the prospective sale;
retrieving a plurality of possible tax due amounts for respective ones of the classification code candidates;
extracting an estimated tax due amount as a statistic of the retrieved possible tax due amounts, the estimated tax due amount having a first value responsive to the selection input indicating a selection of the first risk tolerance value, and a second value different from the first value responsive to the selection input indicating a selection of the second risk tolerance value; and
causing the estimated tax due amount to be communicated to the seller client computer.

2. The method of claim 1, in which the estimated tax due amount is a customs duty.

3. The method of claim 1, in which the estimated tax due amount is an import tax.

4. The method of claim 1, in which:
the presented option further includes a third risk tolerance value distinct from the first risk tolerance value and the second risk tolerance value,
the selection input indicates, in response to the presented option, a selection by the seller of one of the first risk tolerance value, the second risk tolerance value, and the third risk tolerance value, and
the estimated tax due amount has a third value responsive to the selection input indicating a selection of the third risk tolerance value, the third value different from the first value and from the second value.

5. The method of claim 1, in which the one or more classification code queries are formed based at least in part on the buyer jurisdiction.

6. The method of claim 1, in which the one or more classification code queries are formed based at least in part on the item data.

7. The method of claim 1, further including:
transmitting one or more classification code requests that encode the one or more classification code queries; and
inputting one or more classification code responses responsive to the transmitted one or more classification code requests;
wherein the plurality of classification code candidates are inputted from the inputted classification code responses.

8. The method of claim 1, in which one of the classification code candidates is a portion of a harmonized system (HS) code.

9. The method of claim 1, in which one of the classification code candidates includes a portion of a harmonized system (HS) code.

10. The method of claim 1, in which the estimated tax due amount is extracted from a maximum of the retrieved possible tax due amounts.

11. The method of claim 1, in which the estimated tax due amount is extracted from a median of the retrieved possible tax due amounts.

12. The method of claim 1, in which the estimated tax due amount is extracted from an average of the retrieved possible tax due amounts.

13. The method of claim 1, in which the inputted classification code candidates are associated with respective probability weights, and in which the estimated tax due amount is extracted from an average of the retrieved possible tax due amounts that have been adjusted in accordance with the probability weights.

14. The method of claim 1, in which:
the selection input indicates a desired fraction of a prospective range,
at least some of the possible tax due amounts define an actual range, and
the estimated tax due amount is extracted from the desired fraction and from the actual range.

15. The method of claim 1, in which the estimated tax due amount is communicated to the seller client computer explicitly.

16. The method of claim 1, in which the estimated tax due amount is communicated to the seller client computer by being bundled with another value.

\* \* \* \* \*